United States Patent
Line et al.

(10) Patent No.: US 10,279,714 B2
(45) Date of Patent: May 7, 2019

(54) SEATING ASSEMBLY WITH CLIMATE CONTROL FEATURES

(71) Applicant: Ford Global Technologies, LLC, Dearborn, MI (US)

(72) Inventors: Johnathan Andrew Line, Northville, MI (US); Daniel Ferretti, Commerce Township, MI (US); S. M. Akbar Berry, Windsor (CA); Marcos Silva Kondrad, Macomb, MI (US); Michael Kolich, Windsor (CA); Michael Medoro, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 95 days.

(21) Appl. No.: 15/248,138

(22) Filed: Aug. 26, 2016

(65) Prior Publication Data

US 2018/0056834 A1    Mar. 1, 2018

(51) Int. Cl.
*B60N 2/56* (2006.01)
*B60N 2/22* (2006.01)
(Continued)

(52) U.S. Cl.
CPC ......... *B60N 2/5642* (2013.01); *B60N 2/2222* (2013.01); *B60N 2/565* (2013.01);
(Continued)

(58) Field of Classification Search
CPC ..... A47C 7/506; A47C 7/5064; A47C 7/5062; B60N 2/62
See application file for complete search history.

(56) References Cited

U.S. PATENT DOCUMENTS 616,178 A   12/1898   Barron
771,773 A   10/1904   Feely
(Continued)

FOREIGN PATENT DOCUMENTS

CN   201650491 U   11/2010
CN   203097995 U    7/2013
(Continued)

OTHER PUBLICATIONS

Matthew W Ing, United States Patent and Trademark Office, Non Final Office Communication re U.S. Appl. No. 13/749,561, dated Oct. 16, 2015, 33 pages.
(Continued)

*Primary Examiner* — Kyle J. Walraed-Sullivan
(74) *Attorney, Agent, or Firm* — Vichit Chea; Price Heneveld LLP (57) ABSTRACT

A seating assembly includes a seat assembly having a seat carrier. A ventilation control bag is disposed on the seat carrier and includes independent forward thigh support regions. A spacer fabric is disposed over the bag and includes independent forward thigh support regions. A permeable foam heater mat is disposed over the spacer fabric and includes independent forward thigh support regions. A permeable seat trim cover is disposed over the mat. A seatback assembly includes a seatback carrier having upper and lower regions. The upper region is pivotable relative to the lower region. A vent fan assembly is operably coupled with the seatback carrier. A ventilation control bag is in communication with the fan assembly. A spacer fabric is disposed over the bag. A permeable foam heater mat is disposed over the spacer fabric. A permeable seatback trim cover is disposed over the mat.

8 Claims, 6 Drawing Sheets

(51) Int. Cl.
*B60N 2/58* (2006.01)
*B60N 2/62* (2006.01)

(52) U.S. Cl.
CPC ......... *B60N 2/5657* (2013.01); *B60N 2/5685* (2013.01); *B60N 2/58* (2013.01); *B60N 2/62* (2013.01)

(56) References Cited

U.S. PATENT DOCUMENTS

| | | |
|---|---|---|
| 1,125,155 A | 1/1915 | Nunn |
| 2,272,505 A | 2/1942 | Biggs |
| 2,482,996 A * | 9/1949 | Wisby ................ A47C 7/029 297/312 |
| 2,661,050 A | 12/1953 | Felter |
| 2,725,921 A | 12/1955 | Markin |
| 2,799,323 A * | 7/1957 | Berg ................ A47C 3/025 297/284.1 |
| 2,834,606 A | 5/1958 | Bertrand |
| 2,938,570 A | 5/1960 | Flajole |
| 2,958,369 A | 11/1960 | Pitts et al. |
| 3,007,738 A | 11/1961 | Gardel et al. |
| 3,018,133 A | 1/1962 | Mills |
| 3,174,741 A | 3/1965 | Karl |
| 3,203,734 A | 8/1965 | Seymer |
| 3,273,877 A | 9/1966 | Geller et al. |
| 3,328,020 A | 6/1967 | Flint |
| 3,330,598 A | 7/1967 | Whiteside |
| 3,332,719 A | 7/1967 | Flint |
| 3,403,938 A | 10/1968 | Cramer et al. |
| 3,481,327 A | 12/1969 | Drennen |
| 3,512,605 A | 5/1970 | McCorkle |
| 3,520,327 A | 7/1970 | Claydon et al. |
| 3,550,953 A | 12/1970 | Neale |
| 3,565,487 A | 2/1971 | Reiter |
| 3,590,901 A | 7/1971 | Dubinsky |
| 3,592,508 A | 7/1971 | Druseikis |
| 3,612,607 A | 10/1971 | Lohr |
| 3,632,166 A | 1/1972 | Lohr |
| 3,663,057 A | 5/1972 | Lohr et al. |
| 3,667,532 A | 6/1972 | Kurz |
| 3,669,492 A | 6/1972 | Peterson |
| 3,695,706 A | 10/1972 | Basher et al. |
| 3,749,442 A * | 7/1973 | Berg ................ A47C 7/021 297/312 |
| 3,758,159 A | 9/1973 | Morris |
| 3,779,577 A | 12/1973 | Wilfert |
| 3,792,897 A | 2/1974 | Alson |
| 3,795,021 A | 3/1974 | Moniot |
| 3,813,151 A | 5/1974 | Cadiou |
| 3,833,257 A | 9/1974 | Dove |
| 3,877,749 A | 4/1975 | Sakurai et al. |
| 3,880,462 A | 4/1975 | Mednick |
| 3,883,173 A | 5/1975 | Shephard et al. |
| 3,885,831 A | 5/1975 | Rasmussen |
| 3,915,421 A | 10/1975 | Le Forestier |
| 3,929,374 A | 12/1975 | Hogan et al. |
| 4,017,118 A | 4/1977 | Cawley |
| 4,018,477 A | 4/1977 | Hogan |
| 4,058,342 A | 11/1977 | Ettridge |
| 4,088,367 A | 5/1978 | Atkinson et al. |
| 4,115,170 A | 9/1978 | Sanson |
| 4,123,105 A | 10/1978 | Frey et al. |
| 4,136,410 A | 1/1979 | Vandenbark et al. |
| 4,157,203 A | 6/1979 | Ambasz |
| 4,190,286 A | 2/1980 | Bentley |
| 4,192,547 A | 3/1980 | Geier |
| 4,205,877 A | 6/1980 | Ettridge |
| 4,225,989 A | 10/1980 | Corbett et al. |
| 4,306,322 A | 12/1981 | Young et al. |
| 4,309,058 A | 1/1982 | Barley |
| 4,324,431 A | 4/1982 | Murphy et al. |
| 4,334,709 A | 6/1982 | Akiyama et al. |
| 4,337,931 A | 7/1982 | Mundell et al. |
| 4,353,595 A | 10/1982 | Kaneko et al. |
| 4,366,985 A | 1/1983 | Leffler |
| 4,415,147 A | 11/1983 | Biscoe et al. |
| 4,415,203 A | 11/1983 | Cawley |
| 4,440,443 A | 4/1984 | Nordskog |
| 4,444,430 A | 4/1984 | Yoshida et al. |
| 4,452,485 A | 6/1984 | Schuster |
| 4,456,301 A | 6/1984 | Apissomian |
| 4,467,484 A | 8/1984 | Nagatake et al. |
| 4,491,364 A | 1/1985 | Hattori et al. |
| 4,491,365 A | 1/1985 | Murakami |
| 4,492,408 A | 1/1985 | Lohr |
| 4,518,201 A | 5/1985 | Wahlmann et al. |
| 4,519,651 A | 5/1985 | Whitwam |
| 4,522,445 A | 6/1985 | Göldner et al. |
| 4,533,174 A | 8/1985 | Fleishman |
| 4,541,668 A * | 9/1985 | Rouw ................ B62J 1/002 297/201 |
| 4,541,669 A * | 9/1985 | Goldner ................ B60N 2/62 297/284.11 |
| 4,580,837 A | 4/1986 | Bayley |
| 4,583,255 A | 4/1986 | Mogaki et al. |
| 4,583,781 A | 4/1986 | Hatsutta et al. |
| 4,592,588 A | 6/1986 | Isono et al. |
| 4,609,221 A | 9/1986 | Bottcher |
| 4,616,676 A | 10/1986 | Adams et al. |
| 4,616,874 A | 10/1986 | Pietsch et al. |
| 4,629,248 A | 12/1986 | Mawbey |
| 4,629,253 A | 12/1986 | Williams |
| 4,634,179 A | 1/1987 | Hashimoto et al. |
| 4,655,505 A | 4/1987 | Kashiwamura et al. |
| 4,660,887 A | 4/1987 | Fleming et al. |
| 4,664,444 A | 5/1987 | Murphy |
| 4,668,014 A | 5/1987 | Boisset |
| 4,685,738 A | 8/1987 | Tinus |
| 4,693,513 A | 9/1987 | Heath |
| 4,697,848 A | 10/1987 | Hattori et al. |
| 4,707,027 A | 11/1987 | Horvath et al. |
| 4,711,497 A | 12/1987 | Kazaoka et al. |
| 4,718,723 A | 1/1988 | Bottemiller |
| 4,720,141 A | 1/1988 | Sakamoto et al. |
| 4,720,146 A | 1/1988 | Mawbey et al. |
| 4,726,086 A | 2/1988 | McEvoy |
| 4,752,982 A | 6/1988 | Jones et al. |
| 4,753,479 A | 6/1988 | Hatsutta et al. |
| 4,767,155 A | 8/1988 | Kousaka et al. |
| 4,773,703 A | 9/1988 | Kragener et al. |
| 4,775,185 A | 10/1988 | Scholin et al. |
| 4,781,413 A | 11/1988 | Shumack, Jr. |
| 4,790,592 A | 12/1988 | Busso et al. |
| 4,792,186 A | 12/1988 | Benjamin et al. |
| 4,796,313 A | 1/1989 | DiMatteo et al. |
| 4,822,092 A | 4/1989 | Sweers |
| 4,833,614 A | 5/1989 | Saitoh et al. |
| 4,840,429 A | 6/1989 | Stockl |
| 4,856,844 A | 8/1989 | Isono |
| 4,856,846 A | 8/1989 | Lohmeyer |
| 4,858,992 A | 8/1989 | LaSota |
| 4,861,104 A | 8/1989 | Malak |
| 4,869,554 A | 9/1989 | Abu-Isa et al. |
| 4,884,843 A | 12/1989 | DeRees |
| 4,892,356 A | 1/1990 | Pittman et al. |
| 4,893,367 A | 1/1990 | Heimreid et al. |
| 4,915,447 A | 4/1990 | Shovar |
| 4,938,529 A | 7/1990 | Fourrey |
| 4,965,899 A | 10/1990 | Sekido et al. |
| 4,966,410 A | 10/1990 | Bishai |
| 4,971,380 A | 11/1990 | Cote et al. |
| 5,013,089 A | 5/1991 | Abu-Isa et al. |
| 5,018,790 A | 5/1991 | Jay |
| 5,020,852 A | 6/1991 | Marion |
| 5,024,485 A * | 6/1991 | Berg ................ A47C 3/025 297/270.1 |
| 5,050,930 A | 9/1991 | Schuster et al. |
| 5,054,845 A | 10/1991 | Vogel |
| 5,054,856 A | 10/1991 | Wang |
| 5,067,772 A | 11/1991 | Koa |
| 5,082,326 A | 1/1992 | Sekido et al. |
| 5,096,529 A | 3/1992 | Baker |
| 5,104,189 A | 4/1992 | Hanai et al. |

(56) References Cited

U.S. PATENT DOCUMENTS

| | | |
|---|---|---|
| 5,108,150 A | 4/1992 | Stas et al. |
| 5,112,018 A | 5/1992 | Wahls |
| 5,120,109 A | 6/1992 | Rangoni |
| 5,127,708 A | 7/1992 | Kishi et al. |
| 5,129,704 A | 7/1992 | Kishi et al. |
| 5,145,232 A | 9/1992 | Dal Monte |
| 5,171,062 A | 12/1992 | Courtois |
| 5,174,526 A | 12/1992 | Kanigowski |
| 5,186,494 A | 2/1993 | Shimose |
| 5,190,348 A | 3/1993 | Colasanti |
| 5,203,608 A | 4/1993 | Tame |
| 5,222,784 A | 6/1993 | Hamelin |
| 5,243,722 A | 9/1993 | Gusakov |
| 5,263,765 A | 11/1993 | Nagashima et al. |
| 5,285,754 A | 2/1994 | Bell |
| 5,288,127 A * | 2/1994 | Berg .............. A47C 3/025 248/560 |
| 5,318,344 A | 6/1994 | Wang |
| 5,320,409 A | 6/1994 | Katoh et al. |
| 5,323,740 A | 6/1994 | Daily et al. |
| 5,364,164 A | 11/1994 | Kuranami |
| 5,370,443 A | 12/1994 | Maruyama |
| 5,375,569 A | 12/1994 | Santella |
| 5,380,063 A | 1/1995 | Dauphin |
| 5,443,303 A | 8/1995 | Bauer et al. |
| 5,458,365 A | 10/1995 | Rogers et al. |
| 5,518,294 A | 5/1996 | Ligon, Sr. et al. |
| 5,538,326 A | 7/1996 | Lorbiecki |
| 5,544,942 A | 8/1996 | Vu Khac et al. |
| 5,547,214 A | 8/1996 | Zimmerman, II et al. |
| 5,560,681 A | 10/1996 | Dixon et al. |
| 5,570,716 A | 11/1996 | Kamen et al. |
| 5,580,128 A * | 12/1996 | Johnson ............ A47C 7/021 297/314 |
| 5,588,708 A | 12/1996 | Rykken et al. |
| 5,597,203 A * | 1/1997 | Hubbard .......... A47C 7/024 297/284.1 |
| 5,609,394 A | 3/1997 | Ligon, Sr. et al. |
| 5,647,635 A | 7/1997 | Aumond et al. |
| 5,658,050 A | 8/1997 | Lorbiecki |
| 5,662,384 A | 9/1997 | O'Neill et al. |
| 5,678,891 A | 10/1997 | O'Neill et al. |
| 5,681,084 A | 10/1997 | Yoneda |
| 5,690,387 A | 11/1997 | Sarti |
| 5,692,802 A | 12/1997 | Aufrere et al. |
| 5,700,060 A | 12/1997 | Bullard et al. |
| 5,707,109 A | 1/1998 | Massara et al. |
| 5,738,368 A | 4/1998 | Hammond et al. |
| 5,755,493 A | 5/1998 | Kodaverdian |
| 5,758,924 A | 6/1998 | Vishey |
| 5,765,921 A * | 6/1998 | Chuang ............ A47C 16/025 297/423.41 |
| 5,769,489 A | 6/1998 | Dellanno |
| 5,772,280 A | 6/1998 | Massara |
| 5,775,778 A | 7/1998 | Riley et al. |
| 5,785,669 A | 7/1998 | Proctor et al. |
| 5,799,971 A | 9/1998 | Asada |
| 5,803,490 A | 9/1998 | Seventko et al. |
| 5,815,393 A | 9/1998 | Chae |
| 5,823,620 A | 10/1998 | Le Caz |
| 5,826,938 A | 10/1998 | Yanase et al. |
| 5,836,648 A * | 11/1998 | Karschin ........... B60N 2/2222 297/216.14 |
| 5,860,699 A | 1/1999 | Weeks |
| 5,863,092 A | 1/1999 | Kifer |
| 5,868,450 A | 2/1999 | Hashimoto |
| 5,882,073 A | 3/1999 | Burchi et al. |
| 5,893,609 A | 4/1999 | Schmidt |
| 5,895,070 A | 4/1999 | Crimmins et al. |
| 5,902,014 A | 5/1999 | Dinkel et al. |
| 5,906,586 A | 5/1999 | Graham |
| 5,913,568 A * | 6/1999 | Brightbill ......... A47C 3/025 297/258.1 |
| 5,944,341 A | 8/1999 | Kimura et al. |
| 5,951,039 A | 9/1999 | Severinski et al. |
| 5,967,608 A | 10/1999 | Van Sickle |
| 5,975,629 A | 11/1999 | Lorbiecki |
| 5,975,637 A | 11/1999 | Geuss et al. |
| 5,979,985 A | 11/1999 | Bauer et al. |
| 5,983,940 A | 11/1999 | Smith |
| 5,988,674 A | 11/1999 | Kimura et al. |
| 5,988,757 A | 11/1999 | Vishey et al. |
| 6,019,387 A | 2/2000 | Jost |
| 6,019,424 A * | 2/2000 | Ruckert ............ B60N 2/2222 297/216.12 |
| 6,024,378 A | 2/2000 | Fu |
| 6,024,406 A | 2/2000 | Charras et al. |
| 6,030,040 A | 2/2000 | Schmid et al. |
| 6,036,273 A | 3/2000 | Lin |
| 6,050,635 A | 4/2000 | Pajon et al. |
| 6,056,366 A | 5/2000 | Haynes et al. |
| 6,062,642 A | 5/2000 | Sinnhuber et al. |
| 6,068,339 A | 5/2000 | Linzalone |
| 6,079,781 A | 6/2000 | Tilley |
| 6,082,825 A | 7/2000 | Simon |
| 6,088,642 A | 7/2000 | Finkelstein et al. |
| 6,106,071 A | 8/2000 | Aebischer et al. |
| 6,106,163 A | 8/2000 | Inana et al. |
| 6,109,690 A | 8/2000 | Wu et al. |
| 6,116,694 A | 9/2000 | Bullard |
| 6,139,095 A * | 10/2000 | Robertshaw ......... A47C 7/024 297/105 |
| 6,145,925 A | 11/2000 | Eksin et al. |
| 6,155,593 A | 12/2000 | Kimura et al. |
| 6,158,812 A | 12/2000 | Bonke |
| 6,161,231 A | 12/2000 | Kraft et al. |
| 6,170,915 B1 | 1/2001 | Weisz |
| 6,179,379 B1 | 1/2001 | Andersson |
| 6,189,966 B1 | 2/2001 | Faust et al. |
| 6,196,627 B1 | 3/2001 | Faust et al. |
| 6,199,252 B1 | 3/2001 | Masters et al. |
| 6,199,900 B1 | 3/2001 | Zeigler |
| 6,199,951 B1 | 3/2001 | Zeile et al. |
| 6,203,105 B1 | 3/2001 | Rhodes, Jr. |
| 6,206,466 B1 | 3/2001 | Komatsu |
| 6,217,062 B1 | 4/2001 | Breyvogel et al. |
| 6,217,118 B1 | 4/2001 | Heilig |
| 6,220,661 B1 | 4/2001 | Peterson |
| 6,224,150 B1 | 5/2001 | Eksin et al. |
| 6,231,068 B1 | 5/2001 | White, Jr. et al. |
| 6,234,518 B1 | 5/2001 | Ryl et al. |
| 6,257,665 B1 | 7/2001 | Nagamitsu et al. |
| 6,273,810 B1 | 8/2001 | Rhodes, Jr. et al. |
| 6,296,308 B1 | 10/2001 | Cosentino et al. |
| 6,302,431 B1 | 10/2001 | Sasaki et al. |
| 6,312,050 B1 * | 11/2001 | Eklind ............. B60N 2/4221 297/216.15 |
| 6,334,650 B1 | 1/2002 | Chien-Chuan |
| 6,341,797 B1 | 1/2002 | Seo |
| 6,349,993 B1 | 2/2002 | Walsh |
| 6,352,304 B1 | 3/2002 | Sorgenfrei |
| 6,352,310 B1 | 3/2002 | Schmidt et al. |
| 6,357,066 B1 | 3/2002 | Pierce |
| 6,357,789 B1 | 3/2002 | Harada et al. |
| 6,357,827 B1 | 3/2002 | Brightbill et al. |
| 6,364,414 B1 | 4/2002 | Specht |
| 6,375,269 B1 | 4/2002 | Maeda et al. |
| 6,382,720 B1 | 5/2002 | Franklin et al. |
| 6,386,577 B1 | 5/2002 | Kan et al. |
| 6,390,557 B1 | 5/2002 | Asano |
| 6,394,525 B1 | 5/2002 | Seibold |
| 6,394,546 B1 | 5/2002 | Knoblock et al. |
| 6,398,299 B1 | 6/2002 | Angerer et al. |
| 6,398,306 B1 | 6/2002 | Mack |
| 6,419,317 B1 | 7/2002 | Westrich et al. |
| 6,425,602 B1 | 7/2002 | Al-Amin et al. |
| 6,431,734 B1 | 8/2002 | Curry |
| 6,439,597 B1 | 8/2002 | Harada et al. |
| 6,446,945 B1 | 9/2002 | Wisniewski |
| 6,450,571 B1 | 9/2002 | Canni et al. |
| 6,454,353 B1 | 9/2002 | Knaus |
| 6,457,741 B2 | 10/2002 | Seki et al. |
| 6,474,733 B1 | 11/2002 | Heilig et al. |

(56) References Cited

U.S. PATENT DOCUMENTS

| | | |
|---|---|---|
| 6,499,807 B1 | 12/2002 | Kaneda et al. |
| 6,523,892 B1 | 2/2003 | Kage et al. |
| 6,523,902 B2 | 2/2003 | Robinson |
| 6,530,622 B1 | 3/2003 | Ekern et al. |
| 6,550,856 B1 | 4/2003 | Ganser et al. |
| 6,554,365 B2 | 4/2003 | Karschin et al. |
| 6,557,887 B2 | 5/2003 | Wohllebe |
| 6,561,540 B1 | 5/2003 | Hasegawa et al. |
| 6,565,150 B2 | 5/2003 | Fischer et al. |
| 6,565,153 B2 | 5/2003 | Hensel et al. |
| 6,568,754 B1 | 5/2003 | Norton et al. |
| 6,578,911 B2 | 6/2003 | Harada et al. |
| 6,588,838 B1 | 7/2003 | Dick, Jr. et al. |
| 6,612,610 B1 | 9/2003 | Aoki et al. |
| 6,616,177 B2 | 9/2003 | Thomas et al. |
| 6,619,605 B2 | 9/2003 | Lambert |
| 6,619,737 B2 | 9/2003 | Kunkel et al. |
| 6,626,497 B2 | 9/2003 | Nagamitsu et al. |
| 6,629,715 B2 | 10/2003 | Oh et al. |
| 6,637,818 B2 | 10/2003 | Williams |
| 6,672,666 B2 | 1/2004 | Stiller et al. |
| 6,682,059 B1 | 1/2004 | Daniels et al. |
| 6,682,140 B2 | 1/2004 | Minuth et al. |
| 6,695,406 B2 | 2/2004 | Plant |
| 6,698,832 B2 | 3/2004 | Boudinot |
| 6,719,373 B2 | 4/2004 | Zimmermann |
| 6,726,280 B1 | 4/2004 | Liao |
| 6,733,064 B2 | 5/2004 | Fox et al. |
| 6,736,452 B2 | 5/2004 | Aoki et al. |
| 6,746,077 B2 | 6/2004 | Klukowski |
| 6,758,522 B2 | 7/2004 | Ligon, Sr. et al. |
| 6,779,560 B1 | 8/2004 | Reis |
| 6,786,542 B1 | 9/2004 | Nuzzarello |
| 6,802,563 B1 | 10/2004 | Mysliwiec et al. |
| 6,808,230 B2 | 10/2004 | Buss et al. |
| 6,811,219 B2 | 11/2004 | Hudswell et al. |
| 6,820,640 B2 | 11/2004 | Hand et al. |
| 6,820,930 B2 | 11/2004 | Dellanno |
| 6,824,212 B2 | 11/2004 | Malsch et al. |
| 6,848,742 B1 | 2/2005 | Aoki et al. |
| 6,854,869 B1 | 2/2005 | Fernandez |
| 6,860,559 B2 | 3/2005 | Schuster, Sr. et al. |
| 6,860,564 B2 | 3/2005 | Reed et al. |
| 6,866,339 B2 | 3/2005 | Itoh |
| 6,869,140 B2 | 3/2005 | White et al. |
| 6,890,029 B2 | 5/2005 | Svantesson |
| 6,890,030 B2 | 5/2005 | Wilkerson et al. |
| 6,899,399 B2 | 5/2005 | Ali et al. |
| 6,908,151 B2 | 6/2005 | Meeker et al. |
| 6,912,748 B2 | 7/2005 | VanSickle |
| 6,938,953 B2 | 9/2005 | Håland et al. |
| 6,955,399 B2 | 10/2005 | Hong |
| 6,962,392 B2 | 11/2005 | O'Connor |
| 6,988,770 B2 | 1/2006 | Witchie |
| 6,991,256 B2 | 1/2006 | Henderson et al. |
| 6,991,289 B2 | 1/2006 | House |
| 6,997,473 B2 | 2/2006 | Tanase et al. |
| 7,025,423 B2 | 4/2006 | Fujita et al. |
| 7,040,699 B2 | 5/2006 | Curran et al. |
| 7,055,904 B2 | 6/2006 | Skelly et al. |
| 7,059,678 B1 | 6/2006 | Taylor |
| 7,072,764 B2 | 7/2006 | Donath et al. |
| 7,090,301 B2 | 8/2006 | Stadlbauer |
| 7,093,898 B2 | 8/2006 | Ladron De Guevara |
| 7,100,978 B2 | 9/2006 | Ekern et al. |
| 7,100,992 B2 | 9/2006 | Bargheer et al. |
| 7,108,322 B2 | 9/2006 | Erker |
| 7,111,901 B2 | 9/2006 | Schliert et al. |
| 7,125,077 B2 | 10/2006 | Frank |
| 7,131,694 B1 | 11/2006 | Buffa |
| 7,131,756 B2 | 11/2006 | Leslie et al. |
| 7,134,686 B2 | 11/2006 | Tracht et al. |
| 7,140,682 B2 | 11/2006 | Jaeger et al. |
| 7,152,920 B2 | 12/2006 | Sugiyama et al. |
| 7,159,934 B2 | 1/2007 | Farquhar et al. |
| 7,159,938 B1 | 1/2007 | Shiraishi |
| 7,185,950 B2 | 3/2007 | Pettersson et al. |
| 7,195,274 B2 | 3/2007 | Tracht |
| 7,195,277 B2 | 3/2007 | Tracht et al. |
| 7,213,876 B2 | 5/2007 | Stoewe |
| 7,213,883 B2 | 5/2007 | Charnitski |
| 7,216,915 B2 | 5/2007 | Kammerer et al. |
| 7,229,118 B2 | 6/2007 | Saberan et al. |
| 7,229,129 B2 | 6/2007 | White et al. |
| 7,234,771 B2 | 6/2007 | Nakhla |
| 7,261,371 B2 | 8/2007 | Thunissen et al. |
| 7,267,363 B2 | 9/2007 | Tredez |
| 7,284,768 B2 | 10/2007 | Tracht |
| 7,290,791 B2 | 11/2007 | Tracht |
| 7,293,831 B2 | 11/2007 | Greene |
| 7,311,681 B1 | 12/2007 | Vaccarella |
| 7,316,215 B1 | 1/2008 | Nino et al. |
| 7,320,503 B2 | 1/2008 | Eysing |
| 7,322,651 B2 | 1/2008 | Makhsous et al. |
| 7,325,878 B1 | 2/2008 | Dehli |
| 7,341,309 B2 | 3/2008 | Penley et al. |
| 7,344,189 B2 | 3/2008 | Reed et al. |
| 7,347,444 B2 | 3/2008 | Wheelwright |
| 7,350,803 B2 | 4/2008 | Abramczyk et al. |
| 7,350,859 B2 | 4/2008 | Klukowski |
| 7,350,865 B2 | 4/2008 | Pearse |
| 7,357,412 B2 | 4/2008 | Tracht et al. |
| 7,357,454 B2 | 4/2008 | Schiener et al. |
| 7,382,240 B2 | 6/2008 | Egelhaaf |
| 7,387,339 B2 * | 6/2008 | Bykov ................. A47C 3/0252 297/312 |
| 7,393,005 B2 | 7/2008 | Inazu et al. |
| 7,401,852 B2 | 7/2008 | Humer et al. |
| 7,413,253 B2 | 8/2008 | Karlberg |
| 7,425,034 B2 | 9/2008 | Bajic et al. |
| 7,441,797 B2 | 10/2008 | Tracht et al. |
| 7,441,838 B2 | 10/2008 | Patwardhan |
| 7,445,292 B2 | 11/2008 | Moule |
| 7,467,823 B2 | 12/2008 | Hartwich |
| 7,478,869 B2 | 1/2009 | Lazanja et al. |
| 7,481,489 B2 | 1/2009 | Demick |
| 7,481,493 B2 | 1/2009 | Fujita et al. |
| 7,488,040 B2 | 2/2009 | Dozsa-Farkas |
| 7,506,924 B2 | 3/2009 | Bargheer et al. |
| 7,506,938 B2 | 3/2009 | Brennan et al. |
| 7,517,015 B2 | 4/2009 | Terada et al. |
| 7,517,024 B2 | 4/2009 | Cvek |
| 7,523,888 B2 | 4/2009 | Ferry et al. |
| 7,530,633 B2 | 5/2009 | Yokota et al. |
| 7,540,529 B2 | 6/2009 | Tracht et al. |
| 7,543,888 B2 | 6/2009 | Kuno |
| 7,547,068 B2 | 6/2009 | Davis |
| 7,562,934 B2 | 7/2009 | Swan et al. |
| 7,578,552 B2 | 8/2009 | Bajic et al. |
| 7,578,554 B2 | 8/2009 | Lee et al. |
| 7,597,398 B2 | 10/2009 | Lindsay |
| 7,604,294 B2 | 10/2009 | Santamaria |
| 7,611,199 B2 | 11/2009 | Michalak et al. |
| 7,614,693 B2 | 11/2009 | Ito |
| 7,637,568 B2 | 12/2009 | Meeker et al. |
| 7,640,090 B2 | 12/2009 | Uchida et al. |
| 7,641,281 B2 | 1/2010 | Grimm |
| 7,668,329 B2 | 2/2010 | Matsuhashi |
| 7,669,888 B2 | 3/2010 | Sato et al. |
| 7,669,925 B2 | 3/2010 | Beck et al. |
| 7,669,928 B2 | 3/2010 | Snyder |
| 7,669,929 B2 | 3/2010 | Simon et al. |
| 7,677,594 B2 | 3/2010 | Hazlewood et al. |
| 7,677,598 B1 | 3/2010 | Ryan et al. |
| 7,699,339 B2 | 4/2010 | Jang et al. |
| 7,712,833 B2 | 5/2010 | Ueda |
| 7,717,459 B2 | 5/2010 | Bostrom et al. |
| 7,726,733 B2 | 6/2010 | Balser et al. |
| 7,735,932 B2 | 6/2010 | Lazanja et al. |
| 7,752,720 B2 | 7/2010 | Smith |
| 7,753,451 B2 | 7/2010 | Maebert et al. |
| 7,775,552 B2 | 8/2010 | Breuninger et al. |
| 7,775,602 B2 | 8/2010 | Lazanja et al. |
| 7,784,819 B2 | 8/2010 | Lawall et al. |

(56) References Cited

U.S. PATENT DOCUMENTS

| | | |
|---|---|---|
| 7,784,863 B2 | 8/2010 | Fallen |
| 7,793,973 B2 | 9/2010 | Sato et al. |
| 7,794,012 B2 | 9/2010 | Szablewski |
| 7,798,570 B2 | 9/2010 | Kwiecinski et al. |
| 7,802,809 B2 | 9/2010 | Ryan et al. |
| 7,802,843 B2 | 9/2010 | Andersson et al. |
| 7,810,969 B2 | 10/2010 | Blackmore et al. |
| 7,819,470 B2 | 10/2010 | Humer et al. |
| 7,819,480 B2 | 10/2010 | Asbury et al. |
| 7,823,971 B2 | 11/2010 | Humer et al. |
| 7,845,729 B2 | 12/2010 | Yamada et al. |
| 7,850,235 B2 | 12/2010 | Veine et al. |
| 7,850,247 B2 | 12/2010 | Stauske et al. |
| 7,857,381 B2 | 12/2010 | Humer et al. |
| 7,862,113 B2 | 1/2011 | Knoll |
| 7,862,117 B2 | 1/2011 | Hutchinson et al. |
| 7,866,689 B2 | 1/2011 | Saberan |
| 7,871,126 B2 | 1/2011 | Becker et al. |
| 7,871,129 B2 | 1/2011 | Boes et al. |
| 7,878,535 B2 | 2/2011 | Rose et al. |
| 7,878,596 B2 | 2/2011 | Brunner et al. |
| 7,887,094 B2 | 2/2011 | Sakaida |
| 7,891,701 B2 | 2/2011 | Tracht et al. |
| 7,909,360 B2 | 3/2011 | Marriott et al. |
| 7,909,401 B2 | 3/2011 | Hofmann et al. |
| 7,909,403 B2 | 3/2011 | Lawall et al. |
| 7,926,871 B2 | 4/2011 | Meixner et al. |
| 7,926,872 B2 | 4/2011 | Chida et al. |
| 7,931,294 B2 | 4/2011 | Okada et al. |
| 7,931,330 B2 | 4/2011 | Itou et al. |
| 7,938,440 B2 | 5/2011 | Kataoka et al. |
| 7,946,649 B2 | 5/2011 | Galbreath et al. |
| 7,959,225 B2 | 6/2011 | Humer et al. |
| 7,959,226 B2 | 6/2011 | Hattori et al. |
| 7,963,553 B2 | 6/2011 | Huynh et al. |
| 7,963,595 B2 | 6/2011 | Ito et al. |
| 7,963,600 B2 | 6/2011 | Alexander et al. |
| 7,966,835 B2 | 6/2011 | Petrovski |
| 7,967,379 B2 | 6/2011 | Walters et al. |
| 7,971,931 B2 | 7/2011 | Lazanja et al. |
| 7,971,937 B2 | 7/2011 | Ishii et al. |
| 8,011,726 B2 | 9/2011 | Omori et al. |
| 8,011,728 B2 | 9/2011 | Kohl et al. |
| 8,016,355 B2 | 9/2011 | Ito et al. |
| 8,029,055 B2 | 10/2011 | Hartlaub |
| 8,038,222 B2 | 10/2011 | Lein et al. |
| 8,056,923 B2 | 11/2011 | Shimono |
| 8,061,767 B2 * | 11/2011 | Kunzler ............... A47C 3/025 |
| | | 297/201 |
| 8,075,053 B2 | 12/2011 | Tracht et al. |
| 8,100,471 B2 | 1/2012 | Lawall et al. |
| 8,109,569 B2 | 2/2012 | Mitchell |
| 8,111,147 B2 | 2/2012 | Litkouhi |
| 8,113,539 B2 | 2/2012 | Paruszkiewicz et al. |
| 8,123,246 B2 | 2/2012 | Gilbert et al. |
| 8,126,615 B2 | 2/2012 | McMillen et al. |
| D655,393 S | 3/2012 | Whitaker |
| 8,128,167 B2 | 3/2012 | Zhong et al. |
| 8,141,945 B2 | 3/2012 | Akaike et al. |
| 8,162,391 B2 | 4/2012 | Lazanja et al. |
| 8,162,392 B2 | 4/2012 | Humer et al. |
| 8,162,397 B2 | 4/2012 | Booth et al. |
| 8,167,370 B2 | 5/2012 | Arakawa et al. |
| 8,167,376 B2 | 5/2012 | Song |
| 8,177,256 B2 | 5/2012 | Smith et al. |
| 8,196,887 B2 | 6/2012 | Dahlbacka et al. |
| 8,201,883 B2 | 6/2012 | Wuerstlein et al. |
| 8,210,568 B2 | 7/2012 | Ryden et al. |
| 8,210,605 B2 | 7/2012 | Hough et al. |
| 8,210,611 B2 | 7/2012 | Aldrich et al. |
| 8,226,113 B2 | 7/2012 | Yamashita |
| 8,226,165 B2 | 7/2012 | Mizoi |
| 8,231,138 B2 | 7/2012 | Sadr et al. |
| 8,240,758 B2 | 8/2012 | Combest |
| 8,251,396 B2 | 8/2012 | Zothke et al. |
| 8,297,708 B2 | 10/2012 | Mizobata et al. |
| 8,328,227 B2 | 12/2012 | Shimono |
| 8,328,231 B2 | 12/2012 | Nakamura et al. |
| 8,336,910 B1 | 12/2012 | Kalisz et al. |
| 8,342,607 B2 | 1/2013 | Hofmann et al. |
| 8,348,338 B2 | 1/2013 | Galecka et al. |
| 8,360,517 B2 | 1/2013 | Lazanja et al. |
| 8,360,530 B2 | 1/2013 | Onoda et al. |
| 8,371,655 B2 | 2/2013 | Nonomiya |
| 8,388,061 B2 | 3/2013 | Saito et al. |
| 8,397,688 B2 | 3/2013 | Cunningham |
| 8,403,410 B1 | 3/2013 | Pinger et al. |
| 8,408,646 B2 | 4/2013 | Harper et al. |
| 8,447,473 B2 | 5/2013 | Sugiyama et al. |
| 8,469,395 B2 | 6/2013 | Richez et al. |
| 8,474,778 B2 | 7/2013 | Jacobson |
| 8,474,917 B2 | 7/2013 | Line et al. |
| 8,511,748 B2 | 8/2013 | McLeod et al. |
| 8,516,842 B2 | 8/2013 | Petrovski |
| 8,534,760 B2 | 9/2013 | Kotz |
| 8,540,318 B2 | 9/2013 | Folkert et al. |
| 8,585,144 B2 * | 11/2013 | Huttenhuis ............ A47C 7/024 |
| | | 297/217.2 |
| 8,590,978 B2 | 11/2013 | Jaranson et al. |
| 8,602,493 B1 | 12/2013 | Chen et al. |
| 8,657,378 B2 | 2/2014 | Kunert et al. |
| 8,662,483 B2 | 3/2014 | Yamaguchi et al. |
| 8,678,500 B2 | 3/2014 | Lem et al. |
| 8,690,255 B2 | 4/2014 | Yamaki et al. |
| 8,696,067 B2 | 4/2014 | Galbreath et al. |
| 8,727,374 B1 | 5/2014 | Line et al. |
| 8,752,894 B2 | 6/2014 | Trimborn et al. |
| 8,794,707 B2 | 8/2014 | Bocsanyi et al. |
| 8,807,594 B2 | 8/2014 | Mizobata |
| 8,814,269 B2 | 8/2014 | Suzuki et al. |
| 8,827,371 B2 | 9/2014 | Brncick et al. |
| 8,876,215 B2 | 11/2014 | Sei et al. |
| 8,899,683 B2 | 12/2014 | Ito |
| 8,905,431 B1 | 12/2014 | Line et al. |
| 8,967,663 B2 | 3/2015 | Seki et al. |
| 8,979,204 B2 | 3/2015 | Awata et al. |
| 8,991,931 B2 | 3/2015 | Narita et al. |
| 9,096,157 B2 | 8/2015 | Line et al. |
| 9,126,504 B2 | 9/2015 | Line et al. |
| 9,126,508 B2 | 9/2015 | Line et al. |
| 9,193,289 B2 | 11/2015 | Takahashi et al. |
| 9,216,677 B2 | 12/2015 | Line et al. |
| 9,272,647 B2 * | 3/2016 | Gawade ............... B60N 2/5678 |
| 9,320,361 B2 | 4/2016 | Gaines et al. |
| 9,738,191 B2 * | 8/2017 | Langensiepen ...... B60N 2/5678 |
| 9,744,890 B2 * | 8/2017 | Nii ........ B60N 2/5642 |
| 2001/0011812 A1 | 8/2001 | Seki et al. |
| 2002/0043870 A1 | 4/2002 | Kuster et al. |
| 2002/0096915 A1 | 7/2002 | Haupt et al. |
| 2002/0096931 A1 * | 7/2002 | White ............... B60N 2/5635 |
| | | 297/452.42 |
| 2002/0113473 A1 | 8/2002 | Knaus |
| 2002/0145512 A1 | 10/2002 | Sleichter, III et al. |
| 2003/0023363 A1 | 1/2003 | Katz et al. |
| 2003/0025370 A1 | 2/2003 | Hensel et al. |
| 2003/0038517 A1 | 2/2003 | Moran et al. |
| 2003/0137178 A1 | 7/2003 | Craft et al. |
| 2003/0209935 A1 | 11/2003 | Legal |
| 2003/0213105 A1 | 11/2003 | Bednarski |
| 2004/0012237 A1 | 1/2004 | Horiki et al. |
| 2004/0084937 A1 | 5/2004 | Berta |
| 2004/0100139 A1 | 5/2004 | Williams |
| 2004/0108760 A1 | 6/2004 | McMillen |
| 2004/0129585 A1 | 7/2004 | Ballantine et al. |
| 2004/0144349 A1 | 7/2004 | Wampula et al. |
| 2004/0183351 A1 | 9/2004 | Johnson et al. |
| 2004/0195870 A1 | 10/2004 | Bohlender et al. |
| 2004/0212589 A1 | 10/2004 | Hall et al. |
| 2004/0245811 A1 * | 12/2004 | Bevan ............... A47C 7/425 |
| | | 297/180.12 |
| 2005/0035642 A1 | 2/2005 | Hake et al. |
| 2005/0066505 A1 * | 3/2005 | Iqbal ............... A47C 7/72 |
| | | 29/428 |
| 2005/0073183 A1 | 4/2005 | Hsiao |

(56) References Cited

U.S. PATENT DOCUMENTS

| | | |
|---|---|---|
| 2005/0077762 A1 | 4/2005 | Kraemer et al. |
| 2005/0082895 A1 | 4/2005 | Kimmig |
| 2005/0093347 A1* | 5/2005 | Bajic .................. B60N 2/5635 297/180.13 |
| 2005/0110327 A1 | 5/2005 | Chernoff et al. |
| 2005/0127734 A1 | 6/2005 | Veine et al. |
| 2005/0140190 A1 | 6/2005 | Kawashima |
| 2005/0140193 A1 | 6/2005 | Skelly et al. |
| 2005/0179287 A1 | 8/2005 | Hankins |
| 2005/0179291 A1 | 8/2005 | Brodeur |
| 2005/0184569 A1 | 8/2005 | Penley et al. |
| 2005/0189752 A1 | 9/2005 | Itoga et al. |
| 2005/0200166 A1* | 9/2005 | Noh .................... B60N 2/5642 297/180.14 |
| 2005/0236884 A1 | 10/2005 | Neale |
| 2005/0248189 A1 | 11/2005 | Prasatek et al. |
| 2005/0253429 A1 | 11/2005 | Veine et al. |
| 2005/0258624 A1 | 11/2005 | Abraham et al. |
| 2006/0043777 A1 | 3/2006 | Friedman et al. |
| 2006/0113751 A1 | 6/2006 | Tracht et al. |
| 2006/0113762 A1 | 6/2006 | Tracht et al. |
| 2006/0113765 A1 | 6/2006 | Tracht |
| 2006/0138810 A1* | 6/2006 | Knoll .................... A47C 7/74 297/180.1 |
| 2006/0152062 A1 | 7/2006 | Archambault et al. |
| 2006/0155429 A1 | 7/2006 | Boone et al. |
| 2006/0158011 A1* | 7/2006 | Marlovits ............. A47C 7/02 297/180.1 |
| 2006/0175877 A1* | 8/2006 | Alionte ................. A47C 7/74 297/180.14 |
| 2006/0214487 A1 | 9/2006 | Holdampf et al. |
| 2006/0220434 A1 | 10/2006 | Schulz et al. |
| 2006/0244301 A1 | 11/2006 | Jeffries |
| 2007/0029853 A1 | 2/2007 | Forgatsch et al. |
| 2007/0040421 A1* | 2/2007 | Zuzga ................. B60N 2/5621 297/180.13 |
| 2007/0090673 A1 | 4/2007 | Ito |
| 2007/0118259 A1 | 5/2007 | Chernoff et al. |
| 2007/0120401 A1 | 5/2007 | Minuth et al. |
| 2007/0138844 A1 | 6/2007 | Kim |
| 2007/0158981 A1* | 7/2007 | Almasi .................. A47C 7/74 297/180.12 |
| 2007/0170707 A1 | 7/2007 | Sato et al. |
| 2007/0176471 A1* | 8/2007 | Knoll ................. B60N 2/5635 297/180.14 |
| 2007/0188007 A1* | 8/2007 | Lazanja .............. B60N 2/5635 297/452.42 |
| 2007/0200398 A1 | 8/2007 | Volas et al. |
| 2007/0241593 A1 | 10/2007 | Woerner |
| 2007/0296194 A1 | 12/2007 | Ridgway et al. |
| 2008/0036258 A1 | 2/2008 | Holdampf et al. |
| 2008/0067850 A1 | 3/2008 | Stenstrom et al. |
| 2008/0122241 A1 | 5/2008 | Blackmore et al. |
| 2008/0136240 A1 | 6/2008 | Matthews et al. |
| 2008/0157577 A1 | 7/2008 | Lindsay |
| 2008/0174159 A1 | 7/2008 | Kojima et al. |
| 2008/0231099 A1 | 9/2008 | Szczepkowski et al. |
| 2008/0252111 A1 | 10/2008 | Rothkop et al. |
| 2009/0033130 A1* | 2/2009 | Marquette .............. A47C 7/74 297/180.15 |
| 2009/0039690 A1 | 2/2009 | Simon et al. |
| 2009/0066122 A1 | 3/2009 | Minuth et al. |
| 2009/0079236 A1* | 3/2009 | Itou ................... B60N 2/5635 297/180.1 |
| 2009/0085383 A1 | 4/2009 | Hicks et al. |
| 2009/0095725 A1* | 4/2009 | Ohashi ............... B60N 2/5685 219/202 |
| 2009/0102255 A1 | 4/2009 | D'Agostini et al. |
| 2009/0152909 A1 | 6/2009 | Andersson |
| 2009/0160167 A1 | 6/2009 | Itoga |
| 2009/0165263 A1 | 7/2009 | Smith |
| 2009/0195041 A1 | 8/2009 | Ito et al. |
| 2009/0224584 A1 | 9/2009 | Lawall et al. |
| 2009/0250991 A1 | 10/2009 | Mossbeck |
| 2009/0253362 A1* | 10/2009 | Krobok ............... B60N 2/5642 454/120 |
| 2009/0302660 A1 | 12/2009 | Karlberg et al. |
| 2009/0302662 A1 | 12/2009 | Groelsma et al. |
| 2009/0315372 A1 | 12/2009 | Tracht |
| 2009/0322124 A1 | 12/2009 | Barkow et al. |
| 2010/0007122 A1 | 1/2010 | Clauser et al. |
| 2010/0026066 A1 | 2/2010 | Graber et al. |
| 2010/0026077 A1* | 2/2010 | Tarumi ................. A47C 7/021 297/452.62 |
| 2010/0038937 A1 | 2/2010 | Andersson et al. |
| 2010/0045079 A1* | 2/2010 | Andersson ......... B60N 2/5642 297/180.14 |
| 2010/0102599 A1 | 4/2010 | Itou et al. |
| 2010/0109390 A1* | 5/2010 | Nishimura ............ B60N 2/002 297/180.12 |
| 2010/0109397 A1 | 5/2010 | Bandurski et al. |
| 2010/0109401 A1 | 5/2010 | Booth et al. |
| 2010/0117414 A1 | 5/2010 | Hwang et al. |
| 2010/0127551 A1 | 5/2010 | Heidmann et al. |
| 2010/0133794 A1 | 6/2010 | Tracht et al. |
| 2010/0140986 A1 | 6/2010 | Sawada |
| 2010/0140992 A1 | 6/2010 | Yamaguchi |
| 2010/0148546 A1 | 6/2010 | Demontis et al. |
| 2010/0148948 A1 | 6/2010 | Murphy et al. |
| 2010/0171346 A1 | 7/2010 | Laframboise et al. |
| 2010/0187881 A1 | 7/2010 | Fujita et al. |
| 2010/0201167 A1 | 8/2010 | Wieclawski |
| 2010/0207431 A1 | 8/2010 | Petzel et al. |
| 2010/0207438 A1 | 8/2010 | Inoue et al. |
| 2010/0207443 A1 | 8/2010 | Brncick |
| 2010/0231013 A1 | 9/2010 | Schlenker |
| 2010/0270840 A1 | 10/2010 | Tanaka et al. |
| 2010/0283229 A1 | 11/2010 | Feller et al. |
| 2010/0286867 A1 | 11/2010 | Bergholz et al. |
| 2010/0301650 A1 | 12/2010 | Hong |
| 2010/0319796 A1 | 12/2010 | Whitaker |
| 2010/0320816 A1 | 12/2010 | Michalak |
| 2010/0327636 A1 | 12/2010 | Stoll et al. |
| 2011/0018498 A1 | 1/2011 | Soar |
| 2011/0055720 A1 | 3/2011 | Potter et al. |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Bmcick et al. |
| 2011/0133525 A1 | 6/2011 | Oota |
| 2011/0155084 A1 | 6/2011 | Sargeant |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0199200 A1 | 8/2011 | Lueke et al. |
| 2011/0215200 A1 | 9/2011 | Mejuhas |
| 2011/0248532 A1 | 10/2011 | Kim et al. |
| 2011/0254335 A1 | 10/2011 | Pradier et al. |
| 2011/0260506 A1 | 10/2011 | Kuno |
| 2011/0260509 A1 | 10/2011 | Siu |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0285194 A1 | 11/2011 | Marom |
| 2011/0298261 A1 | 12/2011 | Holt et al. |
| 2011/0309604 A1 | 12/2011 | Moore et al. |
| 2012/0013161 A1 | 1/2012 | Adams et al. |
| 2012/0032478 A1 | 2/2012 | Friderich et al. |
| 2012/0032486 A1 | 2/2012 | Baker et al. |
| 2012/0037754 A1 | 2/2012 | Kladde |
| 2012/0041648 A1 | 2/2012 | Yamaguchi et al. |
| 2012/0043791 A1 | 2/2012 | Kojima |
| 2012/0049597 A1 | 3/2012 | Brewer et al. |
| 2012/0063081 A1 | 3/2012 | Grunwald |
| 2012/0080914 A1 | 4/2012 | Wang |
| 2012/0081234 A1 | 4/2012 | Shaffer et al. |
| 2012/0081544 A1 | 4/2012 | Wee |
| 2012/0091695 A1 | 4/2012 | Richez et al. |
| 2012/0091766 A1 | 4/2012 | Yamaki et al. |

(56) References Cited

U.S. PATENT DOCUMENTS

| | | |
|---|---|---|
| 2012/0091779 A1 | 4/2012 | Chang et al. |
| 2012/0109468 A1 | 5/2012 | Baumann et al. |
| 2012/0112515 A1 | 5/2012 | Labish |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0161481 A1 | 6/2012 | Tache et al. |
| 2012/0162891 A1 | 6/2012 | Tranchina et al. |
| 2012/0167845 A1 | 7/2012 | Sands et al. |
| 2012/0175924 A1 | 7/2012 | Festag et al. |
| 2012/0187729 A1 | 7/2012 | Fukawatase et al. |
| 2012/0187731 A1 | 7/2012 | Guadagno |
| 2012/0222900 A1 | 9/2012 | Rodney et al. |
| 2012/0248833 A1 | 10/2012 | Hontz et al. |
| 2012/0248839 A1 | 10/2012 | Fujita et al. |
| 2012/0261974 A1 | 10/2012 | Yoshizawa et al. |
| 2012/0267878 A1 | 10/2012 | Kalisz et al. |
| 2012/0299342 A1 | 11/2012 | Mizobata |
| 2013/0015643 A1 | 1/2013 | Gorman et al. |
| 2013/0076092 A1 | 3/2013 | Kulkarni et al. |
| 2013/0099550 A1* | 4/2013 | Ota .................. B60N 2/5642 297/452.42 |
| 2013/0119646 A1 | 5/2013 | Tracht |
| 2013/0119715 A1 | 5/2013 | Medoro et al. |
| 2013/0119723 A1 | 5/2013 | Nitsuma |
| 2013/0119724 A1 | 5/2013 | Adachi et al. |
| 2013/0119733 A1* | 5/2013 | White .................. A61G 5/14 297/284.1 |
| 2013/0119741 A1 | 5/2013 | Medoro et al. |
| 2013/0134749 A1 | 5/2013 | Awata et al. |
| 2013/0140857 A1* | 6/2013 | Shin .................. B60N 2/5657 297/180.13 |
| 2013/0181492 A1 | 7/2013 | Prescott et al. |
| 2013/0220877 A1 | 8/2013 | Stern |
| 2013/0241255 A1 | 9/2013 | Kulkarni et al. |
| 2013/0285426 A1 | 10/2013 | Arant et al. |
| 2013/0320730 A1 | 12/2013 | Aselage |
| 2013/0320742 A1 | 12/2013 | Murolo et al. |
| 2013/0341975 A1 | 12/2013 | Schneider et al. |
| 2013/0342366 A1 | 12/2013 | Kiefer et al. |
| 2013/0343072 A1 | 12/2013 | Ehrmann et al. |
| 2014/0032043 A1 | 1/2014 | Line et al. |
| 2014/0042781 A1 | 2/2014 | Reeves |
| 2014/0054944 A1 | 2/2014 | Locke et al. |
| 2014/0058305 A1 | 2/2014 | Batterson et al. |
| 2014/0062147 A1 | 3/2014 | Bashir et al. |
| 2014/0070594 A1 | 3/2014 | Awata et al. |
| 2014/0077565 A1 | 3/2014 | Baumgarten et al. |
| 2014/0135991 A1 | 5/2014 | Summer et al. |
| 2014/0139979 A1 | 5/2014 | Blazic |
| 2014/0152057 A1 | 6/2014 | Truant et al. |
| 2014/0167465 A1 | 6/2014 | Sakata et al. |
| 2014/0180181 A1 | 6/2014 | von Oepen et al. |
| 2014/0203599 A1* | 7/2014 | Line .................. B60N 2/5642 297/180.14 |
| 2014/0203606 A1 | 7/2014 | Line et al. |
| 2014/0203610 A1 | 7/2014 | Line et al. |
| 2014/0203617 A1 | 7/2014 | Line et al. |
| 2014/0265506 A1 | 9/2014 | McMillen et al. |
| 2014/0300145 A1 | 10/2014 | Beroth et al. |
| 2014/0300167 A1 | 10/2014 | Datta |
| 2014/0333107 A1* | 11/2014 | Seki .................. B60N 2/62 297/284.1 |
| 2014/0361571 A1 | 12/2014 | Line et al. |
| 2014/0375100 A1 | 12/2014 | Reese |
| 2015/0008716 A1* | 1/2015 | Dry .................. B60N 2/44 297/452.18 |
| 2015/0061331 A1* | 3/2015 | Yang .................. A47C 7/744 297/180.14 |
| 2015/0084395 A1 | 3/2015 | Da Silva Lopes et al. |
| 2015/0108816 A1 | 4/2015 | Dry et al. |
| 2015/0157481 A1 | 6/2015 | Whitaker et al. |
| 2015/0157482 A1 | 6/2015 | Batterson et al. |
| 2015/0165935 A1 | 6/2015 | Sachs et al. |
| 2015/0224006 A1* | 8/2015 | Primo .................. A47C 7/744 297/180.14 |
| 2015/0283970 A1 | 10/2015 | Line et al. |
| 2016/0107551 A1* | 4/2016 | Nii .................. B60N 2/5678 297/180.13 |
| 2016/0332549 A1* | 11/2016 | Marquette .............. B60N 2/5657 |
| 2016/0347224 A1* | 12/2016 | Line .................. B60N 2/686 |
| 2017/0368960 A1* | 12/2017 | Whitmore .................. B60N 2/02 |

FOREIGN PATENT DOCUMENTS

| | | |
|---|---|---|
| DE | 3115269 A1 | 10/1982 |
| DE | 3119867 A1 | 12/1982 |
| DE | 3139945 A1 | 4/1983 |
| DE | 3519351 A1 | 12/1986 |
| DE | 0735428 A1 | 5/1989 |
| DE | 3841688 A1 | 6/1990 |
| DE | 4403071 A1 | 8/1994 |
| DE | 9415511 U1 | 11/1994 |
| DE | 19857386 A1 | 6/2000 |
| DE | 10106238 A1 | 9/2002 |
| DE | 10201836 A1 | 8/2003 |
| DE | 10331612 A1 | 2/2005 |
| DE | 102004037069 A1 | 4/2005 |
| DE | 102006061226 A1 | 6/2008 |
| DE | 102010024180 A1 | 2/2011 |
| DE | 102010024544 A1 | 12/2011 |
| DE | 102012006074 A1 | 11/2012 |
| DE | 102012011226 A1 | 12/2012 |
| EP | 0174884 B1 | 9/1987 |
| EP | 0386890 A1 | 9/1990 |
| EP | 518830 A1 | 12/1992 |
| EP | 0518830 A1 | 12/1992 |
| EP | 0627339 A1 | 12/1994 |
| EP | 0670240 A1 | 9/1995 |
| EP | 0754590 A2 | 1/1997 |
| EP | 0594526 B1 | 9/1997 |
| EP | 921033 A2 | 6/1999 |
| EP | 0921033 A2 | 6/1999 |
| EP | 1050429 A2 | 11/2000 |
| EP | 1077154 A2 | 2/2001 |
| EP | 1123834 A1 | 8/2001 |
| EP | 0926969 B1 | 1/2002 |
| EP | 1266794 A2 | 12/2002 |
| EP | 1325838 A1 | 7/2003 |
| EP | 1462318 A1 | 9/2004 |
| EP | 1123834 B1 | 10/2004 |
| EP | 1002693 B1 | 9/2005 |
| EP | 1050429 B1 | 10/2005 |
| EP | 1084901 B1 | 6/2006 |
| EP | 1674333 A1 | 6/2006 |
| EP | 1674333 B1 | 8/2007 |
| EP | 1839932 A2 | 10/2007 |
| EP | 1950085 A3 | 12/2008 |
| EP | 1329356 B1 | 11/2009 |
| EP | 2289732 A1 | 3/2011 |
| EP | 2423040 A2 | 2/2012 |
| EP | 2534979 A1 | 12/2012 |
| EP | 2565070 A2 | 3/2013 |
| EP | 2574498 A1 | 4/2013 |
| EP | 2743124 A1 | 6/2014 |
| ES | 2107995 T1 | 12/1997 |
| FR | 2562003 A1 | 10/1985 |
| FR | 2875753 A1 | 3/2006 |
| GB | 1260717 A | 1/1972 |
| GB | 2011254 A | 7/1979 |
| GB | 2403139 A | 12/2004 |
| GB | 2430420 B | 3/2009 |
| JP | 61036029 A | 2/1986 |
| JP | 05115331 A | 5/1993 |
| JP | 2008189176 A | 8/2008 |
| JP | 2009096422 A | 5/2009 |
| JP | 201178557 A | 4/2011 |
| JP | 2011098588 A | 5/2011 |
| JP | 2011251573 A | 12/2011 |
| KR | 20050110301 A | 11/2005 |
| KR | 20080066428 A | 7/2008 |
| KR | 20100019390 A | 2/2010 |

(56) References Cited

FOREIGN PATENT DOCUMENTS

| | | | |
|---|---|---|---|
| KR | 20110051692 A | 5/2011 | |
| KR | 1020110051692 A | 5/2011 | |
| KR | 101180702 B1 | 9/2012 | |
| WO | WO9511818 A1 | 5/1995 | |
| WO | 9534449 A1 | 12/1995 | |
| WO | 9815435 A1 | 4/1998 | |
| WO | 9831992 A1 | 7/1998 | |
| WO | 9919708 | 4/1999 | |
| WO | WO9958022 A1 | 11/1999 | |
| WO | 0021797 A1 | 4/2000 | |
| WO | 0144026 A1 | 6/2001 | |
| WO | 2006131189 A1 | 12/2006 | |
| WO | WO2006131189 A1 | 12/2006 | |
| WO | 2007009893 A2 | 1/2007 | |
| WO | 2007028015 A2 | 3/2007 | |
| WO | WO2007028015 A2 | 3/2007 | |
| WO | 2008019981 A1 | 2/2008 | |
| WO | WO2008073285 A1 | 6/2008 | |
| WO | 2010096307 A1 | 8/2010 | |
| WO | WO2011021952 A1 | 2/2011 | |
| WO | 2011068684 A1 | 6/2011 | |
| WO | WO2012008904 A1 | 1/2012 | |
| WO | 2012138699 A1 | 10/2012 | |
| WO | 2013040085 A2 | 3/2013 | |
| WO | 2013070905 A1 | 5/2013 | |
| WO | 2013101644 A1 | 7/2013 | |
| WO | 2014047417 A1 | 3/2014 | |

OTHER PUBLICATIONS

Richard A Lowry, United States Patent and Trademark Office, Non Final Office Communication re U.S. Appl. No. 13/748,847, dated Sep. 10, 2014, 14 pages.
David E Allred, United States Patent and Trademark Office, Non Final Office Communication re U.S. Appl. No. 13/748,857, dated Aug. 25, 2014, 13 pages.
Timothy J Brindley, United States Patent and Trademark Office, Final Office Communication re U.S. Appl. No. 13/749,568, dated Mar. 26, 2015, 9 pages.
Timothy J Brindley, United States Patent and Trademark Office, Non Final Office Communication re U.S. Appl. No. 13/749,568, dated Sep. 8, 2014, 9 pages.
Milton Nelson Jr., United States Patent and Trademark Office, Final Office Communication re U.S. Appl. No. 13/749,572, dated Mar. 3, 2015, 13 pages.
Milton Nelson Jr., United States Patent and Trademark Office, Non Final Office Communication re U.S. Appl. No. 13/749,572, dated Sep. 30, 2014, 20 pages.
Nicole T Verley, United States Patent and Trademark Office, Non Final Office Communication re U.S. Appl. No. 13/749,589, dated Oct. 4, 2013, 12 pages.
Timothy J Brindley, United States Patent and Trademark Office, Non Final Office Communication re U.S. Appl. No. 13/749,595, dated Aug. 28, 2014, 10 pages.
Timothy J Brindley, United States Patent and Trademark Office, Final Office Communication re U.S. Appl. No. 13/749,595, dated Jan. 12, 2015, 10 pages.
Timothy J Brindley, United States Patent and Trademark Office, Non Final Office Communication re U.S. Appl. No. 13/749,584, dated Sep. 15, 2014, 9 pages.
Yolanda G Giacoman, United States Patent and Trademark Office, Final Office Communication re U.S. Appl. No. 13/748,862, dated Dec. 30, 2015, 10 pages.
Yolanda G Giacoman, United States Patent and Trademark Office, Non Final Office Communication re U.S. Appl. No. 13/748,862, dated Aug. 13, 2015, 9 pages.
Yolanda G Giacoman, United States Patent and Trademark Office, Final Office Communication re U.S. Appl. No. 13/748,862, dated Mar. 10, 2015, 19 pages.
Yolanda G Giacoman, United States Patent and Trademark Office, Non Final Office Communication re U.S. Appl. No. 13/748,862, dated Sep. 25, 2014, 16 pages.
Milton Nelson Jr., United States Patent and Trademark Office, Non Final Office Communication re U.S. Appl. No. 13/749,602, dated Sep. 19, 2014, 9 pages.
Melissa Ann Black, United States Patent and Trademark Office, Non Final Office Communication re U.S. Appl. No. 13/914,666, dated Mar. 13, 2015, 6 pages.
Philip F Gabler, United States Patent and Trademark Office, Non Final Office Communication re U.S. Appl. No. 14/025,483, dated Dec. 17, 2014, 8 pages.
Philip F Gabler, United States Patent and Trademark Office, Final Office Communication re U.S. Appl. No. 14/025,483, dated Apr. 23, 2015, 10 pages.
Philip F Gabler, United States Patent and Trademark Office, Non Final Office Communication re U.S. Appl. No. 14/025,483, dated Aug. 18, 2015, 14 pages.
Philip F Gabler, United States Patent and Trademark Office, Final Office Communication re U.S. Appl. No. 14/025,483, dated Dec. 18, 2015, 14 pages.
Peter R Brown, United States Patent and Trademark Office, Final Office Communication re U.S. Appl. No. 14/104,780, dated Dec. 1, 2015, 5 pages.
Peter R Brown, United States Patent and Trademark Office, Non Final Office Communication re U.S. Appl. No. 14/104,780, dated Jun. 29, 2015, 9 pages.
Nicole T Verley, United States Patent and Trademark Office, Advisory Action for U.S. Appl. No. 14/056,005, dated Sep. 30, 2015, 3 pages.
Nicole T Verley, United States Patent and Trademark Office, Final Office Communication re U.S. Appl. No. 14/056,005, dated Jun. 10, 2015, 8 pages.
Nicole T Verley, United States Patent and Trademark Office, Non Final Office Communication re U.S. Appl. No. 14/056,005, dated Mar. 2, 2015, 8 pages.
Peter R Brown, United States Patent and Trademark Office, Non Final Office Communication re U.S. Appl. No. 14/056,000, dated Mar. 4, 2015, 7 pages.
Peter R Brown, United States Patent and Trademark Office, Non Final Office Communication re U.S. Appl. No. 14/056,000, dated Oct. 1, 2014, 8 pages.
Philip F Gabler, United States Patent and Trademark Office, Final Office Communication re U.S. Appl. No. 14/076,893, dated Sep. 29, 2015, 13 pages.
Philip F Gabler, United States Patent and Trademark Office, Non Final Office Communication re U.S. Appl. No. 14/076,893, dated Apr. 21, 2015, 12 pages.
David E Allred, United States Patent and Trademark Office, Non Final Office Communication re U.S. Appl. No. 14/063,647, dated Aug. 18, 2015, 19 pages.
Matthew W Ing, United States Patent and Trademark Office, Non Final Office Communication re U.S. Appl. No. 14/609,092, dated Oct. 19, 2015, 11 pages.
Alexander Scott Harrison, United States Patent and Trademark Office, Final Office Communication re U.S. Appl. No. 14/243,027, dated Jan. 20, 2016, 17 pages.
Alexander Scott Harrison, United States Patent and Trademark Office, Non Final Office Communication re U.S. Appl. No. 14/243,027, dated Aug. 13, 2015, 15 pages.
Ryan D Kwiecinski, United States Patent and Trademark Office, Non Final Office Communication re U.S. Appl. No. 14/230,961, dated Dec. 24, 2015, 12 pages.
Philip F Gabler, United States Patent and Trademark Office, Final Office Communication re U.S. Appl. No. 14/257,655, dated Dec. 18, 2015, 10 pages.
Philip F Gabler, United States Patent and Trademark Office, Non Final Office Communication re U.S. Appl. No. 14/257,655, dated Aug. 20, 2015, 10 pages.
Syed A Islam, United States Patent and Trademark Office, Final Office Communication re U.S. Appl. No. 14/275,368, dated Nov. 13, 2015, 13 pages.

(56) References Cited

OTHER PUBLICATIONS

Syed A Islam, United States Patent and Trademark Office, Non Final Office Communication re U.S. Appl. No. 14/275,368, dated May 6, 2015, 10 pages.
Laurie K Cranmer, United States Patent and Trademark Office, Non Final Office Communication re U.S. Appl. No. 14/505,675, dated Aug. 31, 2015, 7 pages.
Rodney Barnett White, United States Patent and Trademark Office, Non Final Office Communication re U.S. Appl. No. 14/600,166, dated Nov. 2, 2015, 7 pages.
Rodney Barnett White, United States Patent and Trademark Office, Final Office Communication re U.S. Appl. No. 14/534,296, dated Dec. 11, 2105, 14 pages.
Rodney Barnett White, United States Patent and Trademark Office, Non Final Office Communication re U.S. Appl. No. 14/534,296, dated Aug. 26, 2015, 13 pages.
Sanjeev Malhotra, United States Patent and Trademark Office, Non Final Office Communication re U.S. Appl. No. 14/534,285, dated Sep. 23, 2015, 14 pages.
Nicole T Verley, United States Patent and Trademark Office, Non Final Office Communication re U.S. Appl. No. 14/635,025, dated Dec. 4, 2015, 8 pages.
M. Grujicic et al., "Seat-cushion and soft-tissue material modeling and a finite element investigation of the seating comfort for passenger-vehicle occupants," Materials and Design 30 (2009) 4273-4285.
"Thigh Support for Tall Drivers," http://cars.about.com/od/infiniti/ig/2009-Infiniti-G37-Coupe-pics/2008-G37-cpe-thigh-support.htm (1 page) [Accessed from the internet Apr. 10, 2013].
Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).
Erose India Automotive Systems, "Adaptive Sensor Controlled Headrest," http://www.indiamart.com/broseindiaautomotivesystems/products.html, Oct. 9, 2012 (12 pages).
eCOUSTICS.COM, "Cineak Motorized Articulating Headrest Preview," http://www.ecoustics.com/ah/reviews/furniture/accessories/cineak-motorized-headrest, Oct. 9, 2012 (3 pages).
"Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.
"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.
"Imola Pro-fit", Cobra, (http://cobra.subesports.com/products/cat/seats/brand/Cobra/prodID/656), Date unknown, 2 pages.
Freedman Seating Company, "Go Seat," http://www.freedmanseating.com/images/uploads/files/GOSeat_Brochure_10-19.pdf, (date unknown), 2 pgs.
Metro Magazine, "Vehicle Seating Manufacturers Offer Flexible Dseign Options, Enhanced Construction," http://www.metro-magazine.com/article/prinl/2012/01/vehicle-seating-manufacturers-offer-flexible-design-options-enahnced-construction.aspx, Jan. 2012, 3 pgs.
"Seat Comfort Systems", Installation Manual, Kit P/N: SCSOOOOOC3, http://www.techwebasto.com/accessories_mainiseat_accessoriesig_scs_vent_install.pdf, (date unknown), 7 pgs.
Car Reviews, "Audi A4 Saloon RS4", http://www.theaa.com/allaboutcars/cartestreports/2006037.html, Apr. 2006, 5 pgs.
Recaro Gmbh & Co. KG, "Seat Range", ID No. 7218054, Mar. 2010, 21 pgs.
Kelley Blue Book, "2011 Mercedes-Benz CL-Class", http://www.kbb.com/mercedes-benz/cl-class/2011-mercedes-benz-cl-class/, Feb. 28, 2013, 5 pgs.
Lexus, "The all-new Lexus 2013", lexus.com P2-332, Feb. 2012, 13 pgs.
Mercedes-Benz, "Interior comfort—spoilt for choice", http://www.zungfu.com/pc_E_saloon.comfort.1.shtml, Feb. 28, 2013, 3 pgs.
Rostra Precision Controls Inc., "Universal Lumbar Installation Instructions", http://www.rostra.com/manuals/form3132F.pdf, Nov. 2, 2007, 8 pgs.
"Seats", http://www.bavarianmw.com/guide-4400.html, www.bmwmanuals.org, 2012, 5 pgs.
Mercedes-Benz, "Seat belts and airbags", http://www.mbusa.com/vcm/MB/DigitalAssets/pdfmb/serviceandparts/seatbelts_airbags.pdf, Oct. 27, 2005, 11 pgs.
SAE International, "Capacitive Sensors Increase Safety, Comfort", http://sae.org/automag/technewsletter/071106Electronics/04.htm, Jun. 13, 2013, 3 pages.
General Motors LLC, "2013 Chevrolet Spark Owner Manual," copyright 2012, 356 pages.
Seat Comfort Systems, Installation Manual, Kit P/N: SCOOOOOC3, http://www.techwebasto.com/accessories_main/seat_accessories/g_scs_vent_install.pdf, accessed Apr. 27, 2017, 7 pgs.

\* cited by examiner

SEATING ASSEMBLY WITH CLIMATE CONTROL FEATURES

FIELD OF THE DISCLOSURE

The present disclosure generally relates to a seating assembly, and more particularly to a permeable heating/cooling unit in a back and cushion module for a seating assembly.

BACKGROUND OF THE DISCLOSURE

Seating assemblies typically include a seatback to support a back of an occupant in an upright sitting position and various reclined positions. Similar to other portions of a seating assembly, seatbacks are commonly designed to support an occupant in the upright sitting position upon acceleration, change in direction, and collision of the vehicle. Accordingly, seatbacks are substantially rigid and sizeable in construction.

Traditional vehicle seating has frequently included a seat frame that supports a matrix of springs that support a thick cushion thereon. Newer constructions having climate control features add to the bulk. These constructions are generally very thick and heavy, which result in decreased interior space in a vehicle, as well as loss of fuel efficiency as a result of the added weight of the seating system.

SUMMARY OF THE DISCLOSURE

According to one aspect of the present disclosure, a seating assembly includes a seat assembly having a seat carrier. A ventilation control bag is disposed on the seat carrier and includes first and second independent forward thigh support regions. A spacer fabric is disposed over the ventilation control bag and includes first and second independent forward thigh support regions. A permeable foam heater mat is disposed over the spacer fabric and includes first and second independent forward thigh support regions. A permeable seat trim cover is disposed over the permeable foam heater mat. The seating assembly also includes a seatback assembly includes a seatback carrier having an upper region and a lower region. The upper region is pivotable relative to the lower region. A vent fan assembly is operably coupled with the seatback carrier. A ventilation control bag is in communication with the vent fan assembly. A spacer fabric is disposed over the ventilation control bag. A permeable foam heater mat is disposed over the spacer fabric. A permeable seatback trim cover is disposed over the permeable foam heater mat.

According to another aspect of the present disclosure, a seating assembly includes a seat carrier. A ventilation control bag is disposed on the seat carrier. A spacer fabric is disposed over the ventilation control bag and includes first and second independent forward thigh support regions. A permeable foam heater mat is disposed over the spacer fabric and includes first and second independent forward thigh support regions. A permeable trim stock cover is disposed over the foam heater mat.

According to yet another aspect of the present disclosure, a seatback assembly includes a seatback carrier having an upper region and a lower region pivotable relative to the upper region. A vent fan assembly is operably coupled with the seatback carrier. A ventilation control bag is in communication with the vent fan assembly. A spacer fabric is disposed over the ventilation control bag. A permeable foam heater mat is disposed over the spacer fabric. A permeable trim stock cover is disposed over the permeable foam heater mat.

According to still another aspect of the present disclosure, a seating assembly includes a seat assembly having a seat carrier and a ventilation control bag. The ventilation control bag includes first and second independent forward thigh support regions. A spacer fabric is disposed over the ventilation control bag and includes first and second independent forward thigh support regions. A permeable foam heater mat is disposed over the spacer fabric and includes independent forward thigh support regions. A permeable seat trim cover is disposed over the permeable foam heater mat. The seating assembly also includes a seatback assembly includes a seatback carrier having an upper region that is pivotally coupled to a lower region. A vent fan assembly is operably coupled with the seatback carrier. A ventilation control bag is in communication with the vent fan assembly. The seating assembly provides a well ventilated structure that provides climate control and comfort to an occupant of the seating assembly.

These and other aspects, objects, and features of the present disclosure will be understood and appreciated by those skilled in the art upon studying the following specification, claims, and appended drawings.

DETAILED DESCRIPTION OF THE EMBODIMENTS

Figures 1, 1A:
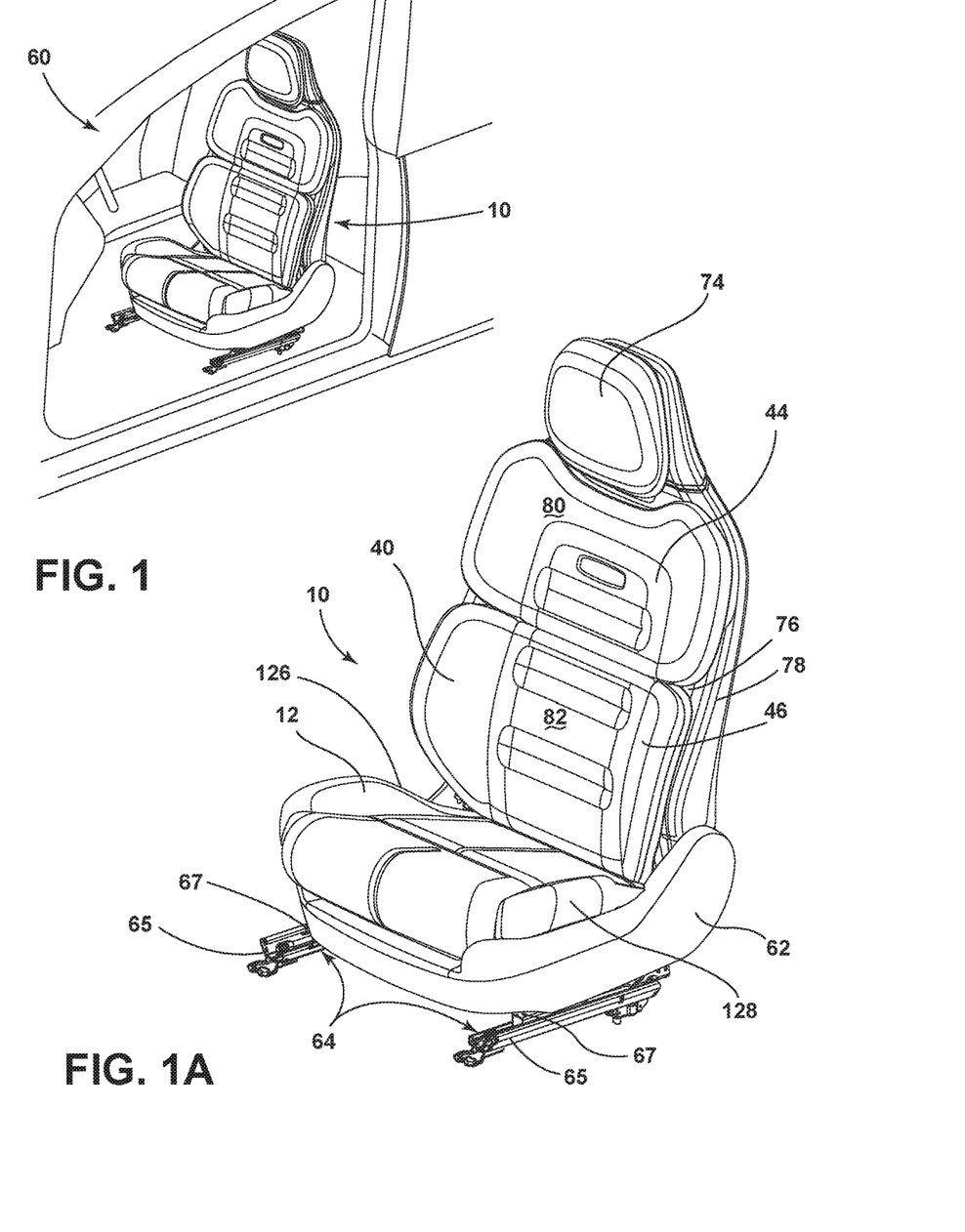
FIG. 1 is a front perspective view of a seating assembly of the present disclosure positioned inside a vehicle.
FIG. 1A is a top perspective view of the seating assembly of FIG. 1.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-3 and 4, reference numeral 10 generally designates a seating assembly includes a seat assembly 12 having a seat carrier 14. A ventilation control bag 16 is disposed on the seat carrier 14 and includes first and second independent forward thigh support regions 18, 20. A spacer fabric 22 is disposed over the ventilation control bag 16 and includes first and second independent forward thigh support regions 26, 28. A permeable foam heater mat 30 is disposed over the spacer fabric 22 and includes first and second independent forward thigh support regions 32, 34. A permeable seat trim cover 36 is disposed over the permeable foam heater mat 30. A seatback assembly 40 (FIG. 4) includes a seatback carrier 42 having an upper region 44 and a lower region 46. The upper region 44 is pivotable relative to the lower region 46. A vent fan assembly 48 is operably coupled with the seatback carrier 42. A ventilation control bag 50 is in communication with the vent fan assembly 48. A spacer fabric 52 is disposed over the ventilation control bag 50. A permeable foam heater mat 54 is disposed over the spacer fabric 52. A permeable seatback trim cover 56 is disposed over the permeable foam heater mat 54.

With reference again to FIGS. 1 and 1A, the seating assembly 10 may be used in any vehicle 60, such as a car, a truck, a van, etc. It is also contemplated that the concept set forth in this disclosure may be utilized in a front or forward position of the vehicle 60 as well as a rear or rearward position of the vehicle 60. The seating assembly 10, as illustrated, includes a seat base 62 that includes rail slide assemblies 64 having rails 65 and slides 67 to allow fore and aft movement of the seating assembly 10 relative to the vehicle 60. The seat assembly 12 is operably coupled with the seat base 62 and is movable relative thereto, as set forth in further detail below. In addition, the seatback assembly 40 of the seating assembly 10 includes a head restraint 74. As shown in FIG. 1A, a peripheral gap 76 is disposed about the seatback assembly 40 between a front closeout panel 78 and an upper seatback cushion member 80 and between the front closeout panel 78 and a lower seatback cushion 82. Each of the components of the seatback assembly 40 may be configured for adjustability via mechanical or electrical controls to properly support the weight of various occupants inside the vehicle 60.

Figure 2:
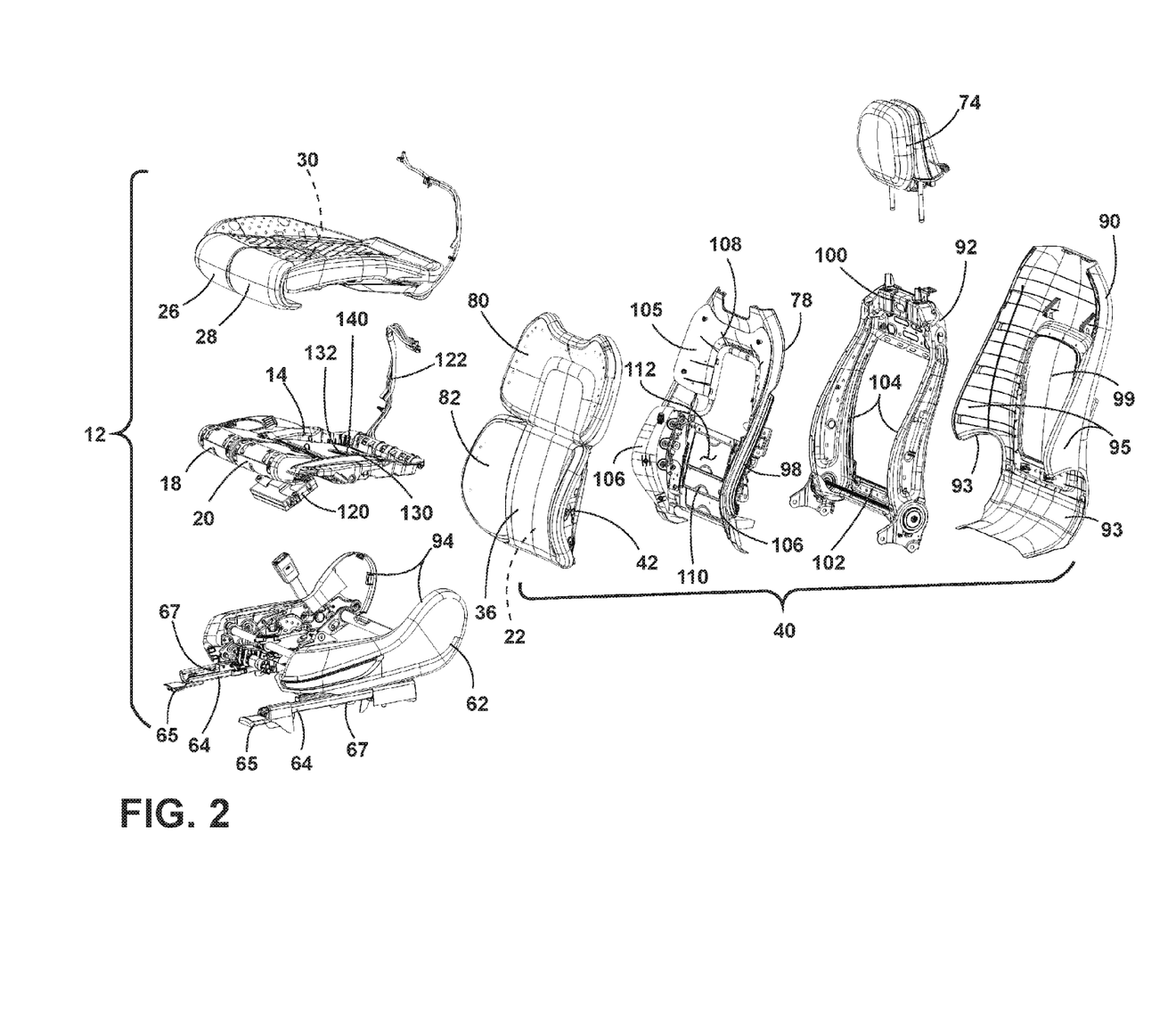
FIG. 2 is a top perspective partially exploded view of the seating assembly of FIG. 1A.

With reference now to FIG. 2, the seatback assembly 40 of the seating assembly 10 generally includes a hardback panel 90 configured to conceal a rear portion of a seatback frame 92. The hardback panel 90 includes lower scalloped regions 93 configured to receive side shrouds 94 of the seat base 62. In addition, the hardback panel 90 includes side portions 95 configured to conceal side members of the seatback frame 92 of the seatback assembly 40 as well as side air bags 98. A rear portion of the hardback panel 90 includes a recess 99 configured to provide a pocket for exterior storage. The seatback frame 92 includes an upper cross member 100 and a lower cross member 102. The upper cross member 100 and the lower cross member 102 are coupled via side frame members 104. The seatback frame 92 provides indirect support to the seatback carrier 42. The seatback frame 92 also provides for support to the lower region 46 of the seatback carrier 42, and allows for pivotal rotation of the upper region 44 relative to the seatback frame 92. An articulation assembly 105 is disposed in front of the seatback frame 92. The articulation assembly 105 includes lower side supports 106, an articulating upper thoracic support 108, and a lower back support 110. The articulating upper thoracic support 108 is pivotally coupled with the lower back support 110, which generally defines a lumbar support assembly. In addition, the lower back support 110 includes a bladder assembly 112 that is operable between inflated and deflated conditions to provide desired support to the lower back of an occupant. The seatback assembly 40 also includes the seatback carrier 42, which supports a cushion in the form of the spacer fabric 22 and the permeable seat trim cover 36.

With reference again to FIG. 2, the seat carrier 14 is supported on the seat base 62, which is translatable fore and aft on the rail slide assembly 64. The seat carrier 14 is pivotally coupled with the first and second independent forward thigh support regions 18, 20. In addition, a component module 120 is disposed below the seat carrier 14 and configured to operably couple with power and data relays of the vehicle 60. The component module 120 includes a wire harness 122 that extends from a rear portion of the seat carrier 14. The seat carrier 14 also includes side bolsters 126, 128. The spacer fabric 22, which generally defines a cushion assembly, is disposed above the seat carrier 14, and the permeable seat trim cover 36 extends over the spacer fabric 22. Notably, the permeable foam heater mat 30 may extend proximate the side bolsters 126, 128 or extend over the side bolsters 126, 128. The seat carrier 14 also includes an open central area 130 configured to receive a fan 132 for a climate control assembly 140 in communication with the ventilation control bag 50. The fan is operably coupled with an upper portion of the seat carrier 14.

Figure 3:
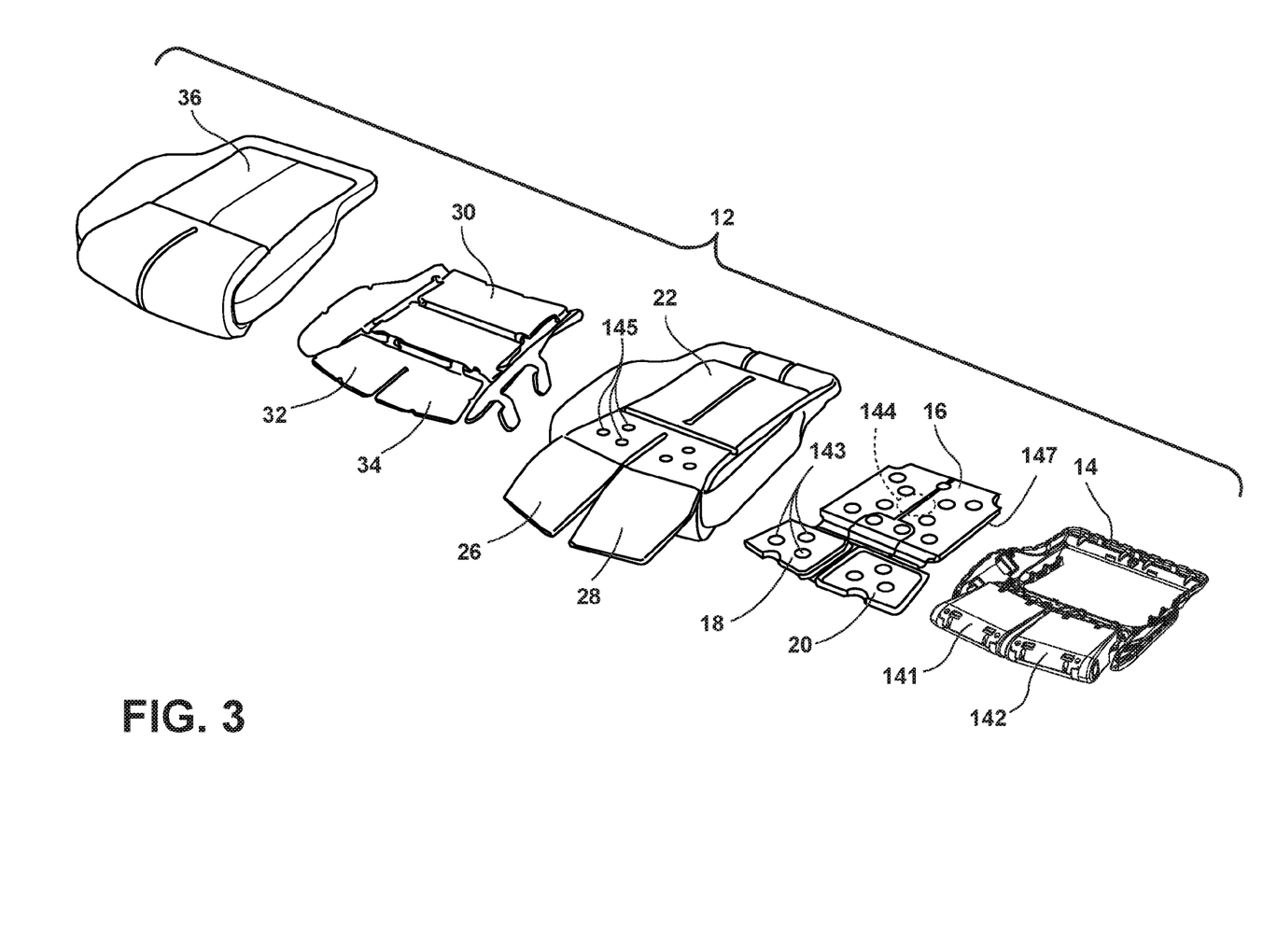
FIG. 3 is a front elevational view of a seatback carrier with climate control features.

With reference now to FIG. 3, the seat carrier 14 includes first and second independent thigh supports 141, 142. The first and second independent thigh supports 141, 142 are adjustable relative to the seat carrier 14 and configured to rotate upward and downward relative to a rearward portion of the seat carrier 14. The first and second independent thigh supports 141, 142 are also configured to support the first and second forward independent thigh support regions 18, 20 of the ventilation control bag 16. The first and second independent forward thigh support regions 18, 20 include a length and width that largely complement the length and width of a top of the first and second independent thigh supports 141, 142. The ventilation control bag 16 also includes a lower opening 144 on a backside 147 of the ventilation control bag 16 configured for sealed engagement with the climate control assembly 140. The backside 147 of the ventilation control bag 16 is otherwise sealed or closed. The climate control assembly 140 moves air through (either blown into or drawn from) the ventilation control bag 16, which moves air through a number of apertures 143 disposed on a top surface 145 of the ventilation control bag 16. The spacer fabric 22 is disposed over the ventilation control bag 16, and may include an open matrix through which air can be drawn, blown, or expelled. Alternatively, the ventilation control bag 16 may include ventilation apertures 145 that are in communication with the ventilation apertures 143 of the ventilation control bag 16. The apertures 143 are strategically placed to move air proximate typical warm spots of the seat assembly 12 that are developed by a seated occupant. The first and second independent forward thigh support regions 26, 28 of the spacer fabric 22 are longer then the first and second independent forward thigh support regions 18, 20 of the ventilation control bag 16. This construction ensures that the first and second independent forward thigh support regions 26, 28 can wrap around the first and second independent forward thigh support regions 18, 20 and the first and second independent thigh supports 141, 142.

With references again to FIG. 3, the heater mat 30 is disposed on the spacer fabric 22 and includes first and second independent thigh support regions 32, 34 configured to rest on the first and second independent thigh support regions 26, 28 of the spacer fabric 22. The first and second independent thigh support regions 32, 34 are not as long as the first and second independent thigh support regions 26, 28 as only the top surface area of the first and second independent thigh supports 14, 142 needs to be warmed. A seated occupant only interfaces with a top area of the first and second independent thigh supports 141, 142. The heater mat 30 also includes bolster heaters 146 configured to supply warmth to the side bolsters 126, 128 of the seat assembly 12. The heater mat 30 is permeable such that air can be drawn though or blown through the heater mat 30.

With reference to FIGS. 2 and 4-6, in the illustrated embodiment, the seatback carrier 42 for the seatback assembly 40 is configured to support the weight of a passenger applying pressure to the cushion assembly disposed on the seatback assembly 40. Accordingly, the seatback carrier 42 generally creates an interface between the cushion assembly and the structural components of the seatback assembly 40. The seatback carrier 42 includes a variety of connection points for coupling with the cushion assembly, the seat trim cover 36, and directly to the seatback frame 92. The seatback carrier 42 is generally defined by the upper region 44 and the lower region 46. Concave connectors 150 couple a lower wall 152 of the upper region 44 with an upper wall 154 of the lower region 46. The upper region 44 generally defines an interior cavity 156 within which a fan support 160 is positioned. Similarly, the lower region 46 also defines a central space 129 that may include climate comfort features, lumbar support features, such as the bladder assembly 112, etc.

With reference again to FIGS. 2 and 4-6, the seatback carrier 42 includes an upper scalloped portion 170 configured to accommodate the head restraint 74 disposed on a top portion of the seatback assembly 40. In addition, the seatback carrier 42 includes a plurality of coverstock detents 172 disposed about a peripheral edge of the seatback carrier 42. The coverstock detents 172 are configured to receive fasteners disposed about a periphery of the seat trim cover 36. The fasteners are designed to engage directly with the peripheral edge of the seatback carrier 42, thereby securing the seat trim cover 36 and the spacer fabric 22 (the cushion assembly) on the seatback carrier 42.

Figure 4:
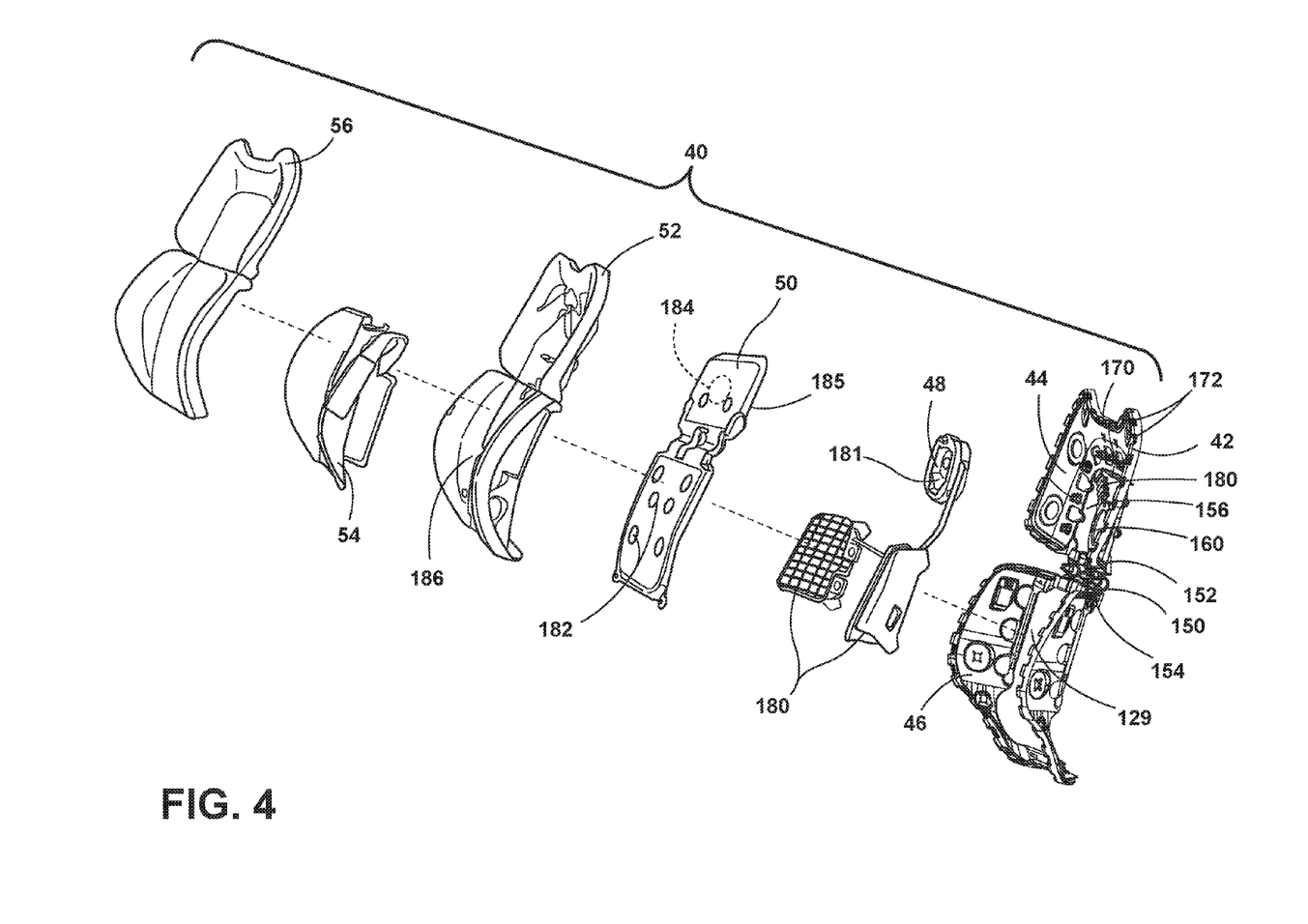
FIG. 4 is a front perspective view of a seat carrier and seatback carrier including a climate control features.
Figure 5:
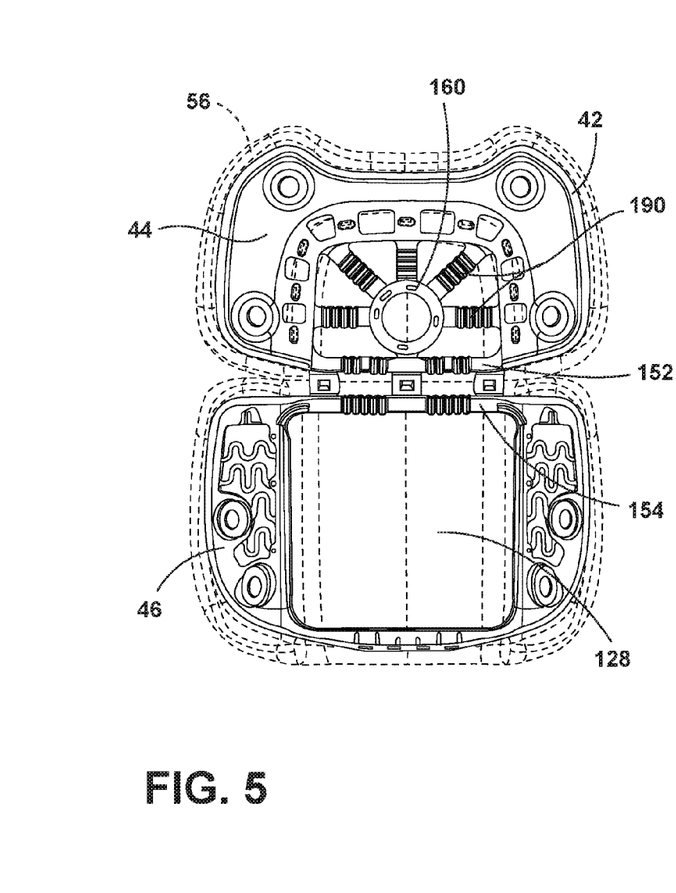
FIG. 5 is a rear perspective view of a seatback carrier of the present disclosure with climate control features installed.
Figure 6:
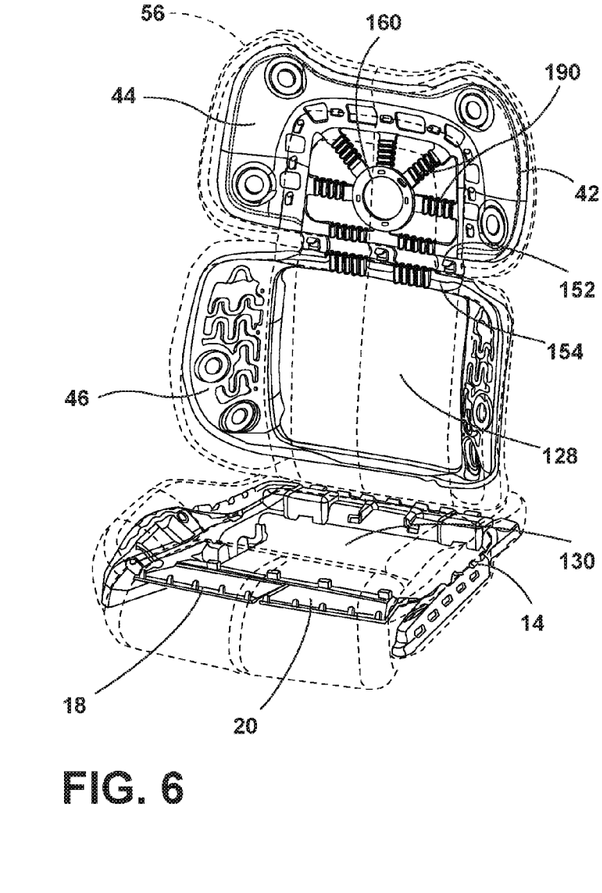
FIG. 6 is a side perspective partially exploded view of a seatback of the present disclosure with a climate control system.
Figure 7:
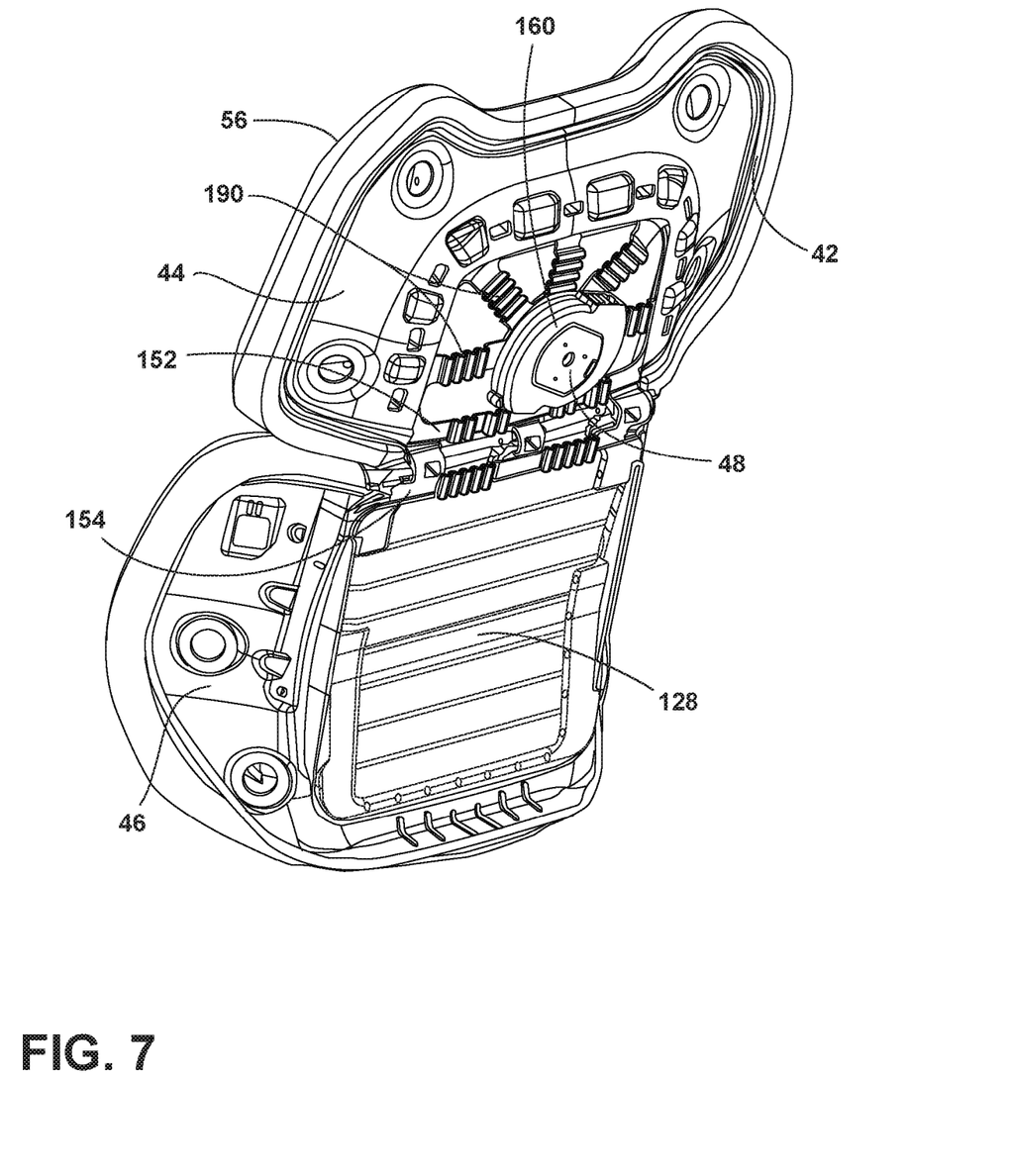
FIG. 7 is a side perspective partially exploded view of a seat of the present disclosure with a climate control system.

With reference now to FIG. 4, the illustrated seatback assembly 40 is configured to provide a modular construction with minimal thickness, thereby providing a leaner more robust seating assembly 10. The seatback carrier 42 is operably coupled with the vent fan assembly 48, which is configured to draw air or blow air from a lumbar area of the seatback assembly 40 via a fan 181. In the illustrated embodiment, the vent fan 181 includes side bolster portions 180 that draw or blow air from the vent fan assembly 48. The side bolster portions 180 are coupled with the vent fan 181 via lines 182. The ventilation control bag 50 is disposed over the vent fan assembly 48 and may include one or more ventilation apertures 182. The vent fan assembly 48 is configured to draw air from the permeable seatback trim cover 56 and the permeable seat trim cover 36 through the permeable foam heater mat 54 and the ventilation control bag 50 and expel the drawn air through a port disposed below the seat assembly 12. The fan 181 is operably coupled with an opening 184 that is defined in a backside 185 of the ventilation control bag 50. The ventilation control bag 50 of the seatback carrier 42 includes an upper portion and a lower portion, the upper portion being separated from the lower portion by at least one closed channel 187. With the exception of the opening 184, the backside 185 of the ventilation control bag 50 is closed. The spacer fabric 52 is disposed over the ventilation control bag 50. The spacer fabric 52 includes an open matrix of fibers 186. However, the spacer fabric 52 may include a plurality of apertures configured to communicate with the ventilation apertures 182 of the ventilation control bag 50. The backside 185 of the spacer fabric 52 includes a recess defined in the backside 185 of the spacer fabric 52 to receive the ventilation control bag 50. The permeable foam heater mat 54 is located proximate a lumbar region of the seatback assembly 40 and supplies heat to the lower back of an occupant through the permeable seatback trim cover 56.

With reference now to FIGS. 4-7, the fan support 160 is operably coupled with the lower wall 152 of the upper region 44 and also coupled with angled supports 190. Each of the angled supports 190 extends into the intermediate space of the upper region 44 and each includes an undulating or sinusoidal configuration. This construction allows for flexibility and movement of the fan support 160 to accommodate the different weights of occupants and also different postures and loads that can affect the seatback assembly 40. As previously noted, the closed bottom side of the upper region 44 includes the lower wall 152, which has an undulating or sinusoidal configuration. Notably, the undulating or sinusoidal configuration of the lower wall 152 of the upper region 44 undulates in a plane generally parallel with a seating surface of the seatback assembly 40. Accordingly, the undulations extend forward and rearward relative to the surface of the seatback assembly 40. The upper wall 154 of the lower region 46 also includes a sinusoidal configuration. The sinusoidal configuration of the upper wall 154 of the lower region 46 also undulates forward and rearward relative to the seatback assembly 40. It will be understood that the seatback carrier 42 is generally curved to complement the shape of the back of an occupant. More specifically, the upper region 44 is shaped to generally cradle and support the upper back of an occupant, while the lower region 46 is designed to cradle and support the lower back of an occupant.

The aforementioned seating assembly 10 is constructed to allow for the heat of a human body to escape, thereby providing a more comfortable heating and cooling experience on the seating assembly 10. Maintaining climate comfort on the seating assembly 10 provides for increased comfort to the occupant during travel. The permeable seatback trim cover 56, which extends over the spacer fabric 22 and which may include a thin foam mounting surface, also includes the permeable foam heater mat 30. This construction allows heat to dissipate away from an occupant. As shown in FIG. 3, the seating assembly 10 includes a plurality of venting holes that allow for increased heat and air transfer, while maintaining seat surface support. In a similar fashion, as shown in FIG. 4, the spacer fabric 22 of the seatback assembly 40 includes venting holes, as does the ventilation control bag 50 of the seatback assembly 40. In addition, both the seat carrier 14 and the seatback carrier 42 include compact foam that has a purposeful inset that extends approximately 10 to 15 mm and which is molded into a backside of the compact foam. This allows for the climate control assembly 140 to push or pull warm air or cool air from an occupant using a fan or other air moving device. The manner in which the layers are constructed and the order in which the layers are constructed promotes greater circulation of and distribution of heating and cooling to the occupant. Further, these systems are generally constructed to provide air movement to areas of the seat that typically have little air movement. The comfort carrier as set forth herein is a completely permeable assembly that allows heat transfer to be controlled to enable more natural cooling effects on an occupant. Specifically, the comfort carrier, the foam and trim, the heating mat system, and the cooling distribution system are all permeable to provide air movement on or near an occupant. These features are provided on a quick connect attachment for the seating application, which is important because the seating assembly 10 can be constructed quickly at minimal cost as compared to more elaborate climate comfort systems that are not modular and which require costly and time intensive construction.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A seating assembly comprising:
    a seat assembly including:
        a seat carrier supported on a seat frame and including first and second independently adjustable thigh supports;
        a ventilation control bag disposed on the seat carrier and including first and second independent forward thigh support regions;
        a spacer fabric disposed over the ventilation control bag and including first and second independent forward thigh support regions;
        a permeable foam heater mat disposed over the spacer fabric and including first and second independent forward thigh support regions; and
        a permeable seat trim cover disposed over the permeable foam heater mat; and
    a seatback assembly including:
    a seatback carrier including an upper region and a lower region, the upper region being pivotable relative to the lower region, the seatback carrier comprising:
        a vent fan assembly operably coupled with the seatback carrier;
        a ventilation control bag in communication with the vent fan assembly;
        a spacer fabric disposed over the ventilation control bag;
        a permeable foam heater mat disposed over the spacer fabric; and
        a permeable seatback trim cover disposed over the permeable foam heater mat.

2. The seating assembly of claim 1, wherein the permeable foam heater mat includes side bolster portions.

3. The seating assembly of claim 1, further comprising:
    a fan operably coupled with an upper portion of the seat carrier.

4. The seating assembly of claim 1, wherein the ventilation control bag of the seatback carrier includes a top side with a plurality of apertures disposed therein and a closed rear bottom side.

5. The seating assembly of claim 4, wherein the ventilation control bag of the seatback carrier includes an upper portion and a lower portion, the upper portion being separated from the lower portion by at least one channel.

6. The seating assembly of claim 1, wherein the vent fan assembly is configured to draw air from the permeable seatback trim cover and permeable seat trim cover through the permeable foam heater mat and the ventilation control bag and expel the drawn air through a port disposed below the seat assembly.

7. The seating assembly of claim 1, wherein the seatback carrier includes a lower opening configured to accommodate a lumbar support assembly.

8. The seating assembly of claim 1, wherein a backside of the spacer fabric of the seatback carrier defines a recess.

* * * * *